(12) United States Patent
Urata

(10) Patent No.: US 7,215,497 B2
(45) Date of Patent: May 8, 2007

(54) ADJACENT TRACK DATA GUARANTEE PROCESSING METHOD AND DISK DEVICE

(75) Inventor: Yukio Urata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 97 days.

(21) Appl. No.: 10/427,806

(22) Filed: Apr. 30, 2003

(65) Prior Publication Data

US 2003/0214743 A1  Nov. 20, 2003

(30) Foreign Application Priority Data

May 15, 2002  (JP) ............................. 2002-140480

(51) Int. Cl.
  *G11B 5/09*  (2006.01)
  *G11B 5/03*  (2006.01)
  *G11B 21/02*  (2006.01)
(52) U.S. Cl. ............................. 360/53; 360/75; 360/66
(58) Field of Classification Search .................. 360/53, 360/31, 77.02
  See application file for complete search history.

(56) References Cited

U.S. PATENT DOCUMENTS 4,516,165 A * 5/1985 Cunningham et al. ........ 360/53
6,643,084 B1 * 11/2003 Andrew et al. ................ 360/53
6,650,491 B2 * 11/2003 Suzuki et al. .................. 360/31
6,781,780 B1 * 8/2004 Codilian ........................ 360/60
2003/0202268 A1 * 10/2003 Wang et al. .................... 360/31

FOREIGN PATENT DOCUMENTS

| JP | 6-052635 | 2/1994 |
| JP | 11-203614 | 7/1999 |
| JP | 2001-014606 | 1/2001 |
| JP | 2001-118343 | 4/2001 |

OTHER PUBLICATIONS

Dual Write Inhibit by IBM technical Disclosure Bulletin, Feb. 2000, Issue No. 430 Page No. 333 Publication date Feb. 1, 2000 cross reference: 0374-4353-0-430-333.*

* cited by examiner

*Primary Examiner*—Andrea Wellington
*Assistant Examiner*—Varsha A. Kapadia
(74) *Attorney, Agent, or Firm*—Greer, Burns & Crain, Ltd.

(57) ABSTRACT

A guarantee processing method guarantees the data of an adjacent track in the case of a write fault when there is a possibility of an off track write. Even if a write fault is detected or an offset read retry is successful, a rewrite for guaranteeing an adjacent track is not executed immediately. The possibility of an off track write is judged by the movement of the head, and only the sector which is difficult to read due to the off track write is rewritten.

12 Claims, 18 Drawing Sheets

FIG. 17
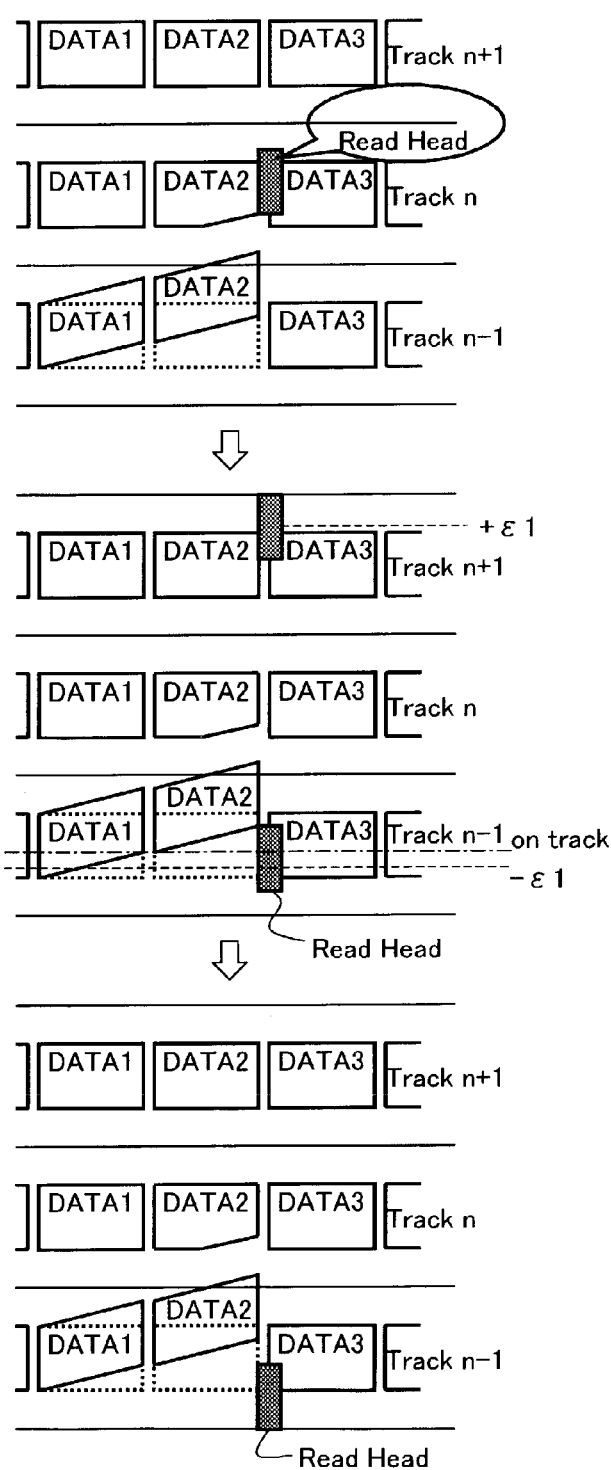
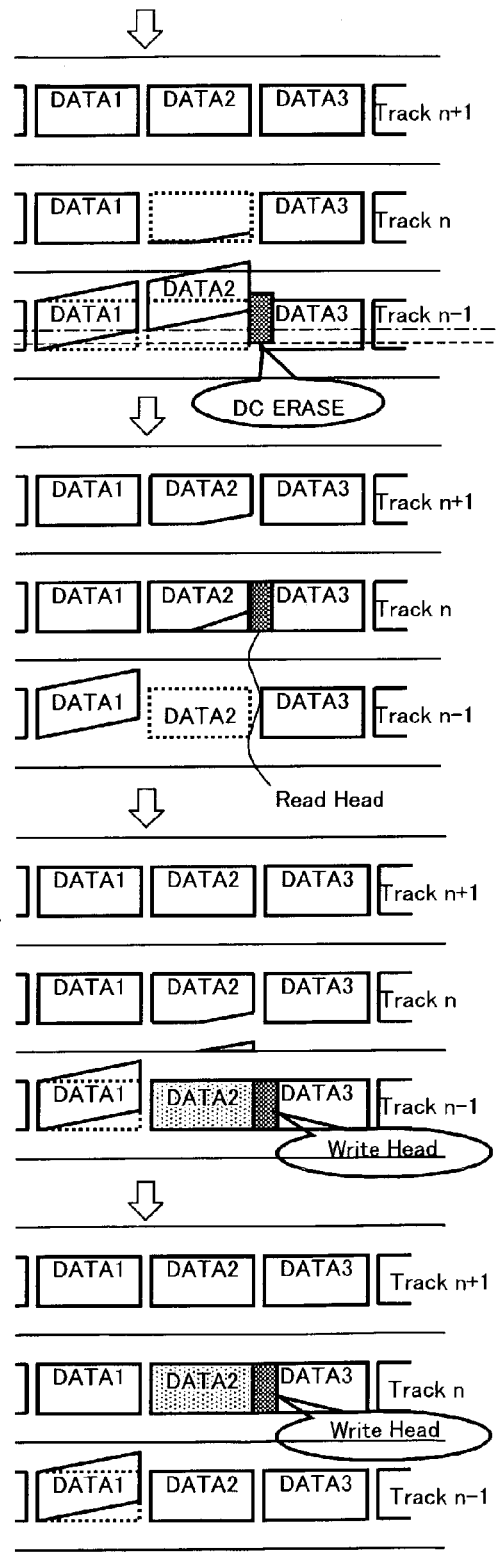

DATA 5

ADJACENT TRACK DATA GUARANTEE PROCESSING METHOD AND DISK DEVICE

BACKGROUND OF THE INVENTION

1. Field of the Invention

The present invention relates to an adjacent track data guarantee processing method for executing guarantee processing on data of an adjacent track which is influenced by data writing on a predetermined track on a disk, and a disk device using this method, and more particularly to a guarantee processing method for adjacent track data and a disk device, which allows to execute an offset read check for the adjacent data which may have been influenced by data erasing, then to rewrite the data only when a predetermined degree or higher off track writing is detected, so that adjacent data which cannot be completely read due to off track writing is prevented.

2. Description of the Related Art

Compact and large capacity storage devices are in wide use. Such a storage device is comprised of a storage medium where many recording tracks are created concentrically or in spirals, an optical or magnetic head, and an actuator which positions the head at a desired track. The head reads or writes the data of the positioned track.

In such a disk device, the head is positioned at a desired track, and the head follows up the track by a track servo control. In this case, track pitch and other factors are designed such that even if the head writes data at a certain location of the track while being shaken within the specification limit, the written data does not influence the data of an adjacent track, and the data written while the head is shaken can be read.

Also track pitch and other factors are designed with sufficient margins so that even if the head writes data while being shaken outside the specification limit, the data of an adjacent track is not influenced. Also a device where the head is always shaken exceeding the specification limit is not shipped as a defective product.

Therefore even if data is written at a head position outside specification during data writing, only a write retry is executed until the data is written within the specification limit. In the case of a magnetic disk device, the write operation outside the specified head position stays only in one frame, since the write operation is immediately paused when it is detected that the head has written the data outside the specified position (write fault), and the sampling speed of the head for detection is sufficiently fast with respect to the shaking of the head.

As mentioned above, the magnetic disk device is designed such that adjacent data is not influenced because of mechanical reasons and the detection sampling speed, even if data is written while the head is shaken outside the specification limit in a normal working environment.

Recently, however, the density of stored data on a disk is increasing, and the track width of a disk is becoming smaller and smaller. Applications of a magnetic disk device are expanding, and now a disk device is built into not only fixed terminals but portable terminals as well. Therefore the occasions to receive shocks outside the specification limit are increasing, and the guarantee of data in such cases is demanded.

Although it is designed that adjacent track data is not influenced, the data of an adjacent track is somewhat affected (deleted) if the track is written several ten thousand times due to the characteristics of the head.

Therefore many technologies for preventing the deletion of data, by rewriting the affected data of the adjacent cylinder at the point when an off track write (write fault) beyond a certain degree is detected, have been proposed.

FIG. 18 is a diagram depicting the sector format of a magnetic disk device, where one sector is comprised of a servo section and data sections 1, 2, 3, 4, and 5, and the head is positioned by the signal of the servo section. FIG. 19 shows the format during data write, wherein the track interval is designed such that an adjacent sector positioned at the adjacent track is not influenced even if the head is shaken exceeding the specification limit during normal use.

FIG. 20 is a diagram depicting conventional processing when an off track write occurs to a magnetic disk device. When an off track write (or write fault) is detected during data write by the position of the write head, the track data of the track itself is recovered by rewriting data returning to a specified sector from the detected sector. However, the data D5 of the adjacent sector becomes difficult to read due to the off track write. If data D5 remains in this status and is influenced by an off track write from the other side of the track n+2, data D5 cannot be read at all.

Therefore when an off track write is detected, the head returns to a specified sector from the detected sector, and rewrites the data to recover the data of the track itself first, then for the data of the adjacent sector, a read operation is attempted until the data is read, and the data which is difficult to read is recovered by rewriting the data at the point when the data can be read. In FIG. 20, there is one adjacent sector to be recovered, but the data of a plurality of sectors may be recovered returning to a specified sector of the adjacent track.

For reading data as well, when the data cannot be read on the track n but can be read with offset, as shown in FIG. 21, it is judged that this data 2 has the possibility of an off track write, and this data 2 is rewritten returning to a specified sector from the detected sector to recover the data of track n first, and for the data 2 in the adjacent sector as well, a read operation is attempted and data is rewritten at the point when the data can be read so that the data which is difficult to read can be recovered.

These adjacent data guarantee processing when an off track write is detected are proposed in Japanese Patent Laid-Open No. 6-52635, Japanese Patent Laid-Open No. 11-203614, Japanese Patent Laid-Open No. 2001-14606, and Japanese Patent Laid-Open No. 2001-118343, for example.

In such prior art, adjacent data guarantee processing is executed when a write fault is detected or when a predetermined amount of offset read retries is detected. The write fault is detected when it is recognized that the position of the head exceeded the write off track slice in a frame of the target sector during data write. The value of the write off track slice is defined by the deviation of the head position from the center position of the track, and a value derived from the characteristics of the head and medium, and by research.

The write off track slice value is also determined such that the read head can read the data at the center of the track (on track) without problems, even when the head writes data with offset within this write off track slice. In the same way, guarantee processing during a read is executed when the data can be read with a predetermined head offset amount during a read retry.

Conventionally when a write fault is detected or when the data can be read by an offset read retry, it is judged unconditionally that there is the possibility that an adjacent sector may not be read, and adjacent data guarantee processing is executed by reading the adjacent sector and rewriting the data.

However, as described above, if the disk device is used for portable equipment, it is possible that a write fault will occur frequently depending on the environment of the device, such as the case of installing in a vibrating location. And the device reports the write fault to the host only when the data cannot be written normally, even if a write retry is continuously executed for a plurality of times.

Therefore if adjacent sector guarantee processing is executed each time a write fault is detected, safety is high in terms of data guarantee, but processing to read an adjacent sector and to rewrite the data occurs many times, making the performance of the device inefficient, particularly when the read/write speed drops. Also as described above, the device is designed with sufficient margins so that the occurrence of a write fault does not have the influence of disabling the reading of an adjacent sector, so it is very rare a write fault due to a strong shock influencing an adjacent sector occurs. Since write faults which do not influence an adjacent sector exist in this way, conventional adjacent sector guarantee processing executes excessive guarantee processing, which drops the high-speed reading and writing performance of the device.

SUMMARY OF THE INVENTION

With the foregoing in view, it is an object of the present invention to provide an adjacent track data guarantee method and a disk device thereof for executing guarantee processing which checks the data of an adjacent sector which may be affected at the point when an off track write at a predetermined degree is detected, and executes guarantee processing.

It is another object of the present invention to provide an adjacent track data guarantee processing method and a disk device thereof which detects a write fault, executes a read check of the data of the adjacent sector, and executes guarantee processing for the affected data.

It is still another object of the present invention to provide an adjacent track data guarantee processing method and a disk device thereof which detects a read offset amount at a read retry exceeding a predetermined amount, executes a read check for the data of the adjacent sector, and executes guarantee processing for the affected data.

It is still another object of the present invention to provide an adjacent track data guarantee method and a disk device thereof which can easily execute a read check of data of an adjacent sector which may have been affected at the point when an off track write at a predetermined degree is detected, and executes guarantee processing for the affected area.

To achieve these objects, an adjacent data guarantee processing method of the present invention comprises a step of detecting that the head wrote data on a sector of the track with a predetermined off track amount or more, a step of detecting whether it is possible that the head caused an off track write on the adjacent track at the off track write detection, a step of rewriting data to the sector of the track if it is not possible that the off track write occurred, a step of offsetting the data of the sector of the adjacent track in a predetermined track direction and reading the data when it is possible that an off track write occurred; a step of executing a retry read of the sector which cannot be read in the read step and reading the data, and a step of rewriting the sector which cannot be read of the adjacent track, and sectors of the predetermined track.

The disk device of the present invention comprises a head for reading and writing data on a desired sector of a predetermined track of a disk, an actuator for positioning the head on the predetermined track of the disk, and a controller for controlling the head and the actuator, and detecting that the head wrote data on the sector of the track with a predetermined off track amount or more. And the controller detects whether it is possible that the head executed an off track write on the adjacent track at the off track write detection, rewrites the data on the sector of the track if it is not possible that an off track write occurred, executes an offset read of the data of the sector of the adjacent track in the predetermined track direction, executes a retry read of the sector which cannot be read by the above read step, and rewrites the sector of the adjacent track which cannot be read and the sector of the above mentioned predetermined track if it is possible that an off track write occurred.

According to the present invention, even if a write fault is detected, the adjacent track is not rewritten immediately to guarantee the data, but it is first judged whether the write fault possibly caused an off track write, and if the write fault did cause an off track write, the sector which is difficult to read due to an off track write is detected, and only that sector is rewritten.

Therefore even if the disk device is used in an environment where write faults are often detected, the number of times of adjacent track data guarantee processing decreases, and a drop in the read/write performance can be prevented. And since the sectors which are actually difficult to read are detected with a predetermined offset by a read check, only the sectors which are difficult to read can be rewritten, which decreases the guarantee processing time.

Also according to the present invention, it is preferable that the above mentioned retry read step further comprises a first retry read step, a step of executing offset DC erasing of the sectors of the predetermined track corresponding to the sectors which could not be read in the first retry read, and a step of executing a retry read of the sectors which could not be read in the first retry read after DC erasing.

By this, the success rate of reading a sector where an off track write occurred in a retry read increases.

According to the present invention, it is preferable that the step of detecting the possibility of an off track write further comprises a step of detecting the movement of the head under conditions different from the conditions of the off track write detection.

Also according to the present invention, it is preferable that the step of detecting the possibility of an off track write further comprises a step of detecting the movement of the head with a position standard value greater than the off track position standard value of the above mentioned off track write detection.

Also according to the present invention, it is preferable that the step of detecting the possibility of an off track write further comprises a step of detecting the movement of the head by adding a condition on the speed or acceleration of the head to the off track position standard value for the above mentioned off track write detection.

This makes the detection of an off track write possibility easier and accurate, and prevents unnecessary processing.

An adjacent data guarantee processing method of the present invention comprises a step of detecting that the head read data of a sector of the track with a predetermined read offset amount or more, a step of detecting whether it is possible that an off track write occurred to the predetermined track or the adjacent track with the read offset amount whereby the data could be read, a step of reading the data of the sector of the adjacent track with an offset position if it is possible that an off track write occurred, a step of executing a retry read of the sectors which cannot be read in the above read step, and reading the data, and a step of rewriting the above mentioned sectors of the adjacent track which cannot be read and the sectors of the above mentioned predetermined track.

According to the present invention, even if an offset read retry succeeds, an adjacent track is not immediately rewritten to guarantee the data, but it is first judged whether it is the offset read retry where an off track write possibly occurred, and if it is an offset read retry where an off track write possibly occurred, the sector which became difficult to read due to an off track write is detected, and only that sector is rewritten.

Therefore even if the disk device is used in an environment where write defaults are often detected, the number of times of adjacent track data guarantee processing decreases, and a drop in the read/write performance can be prevented. And since the sectors which are actually difficult to read are detected by a read check based on a predetermined offset, only the sectors which became difficult to read can be rewritten, which decreases the guarantee processing time.

According to the present invention, it is preferable that the retry read step further comprises a first retry read step, a step of DC erasing of the sector of the predetermined track corresponding to the sector which could not be read is executed when there is a section which cannot be read in the first retry read, and a step of executing a retry read of the sector which could not be read in the first retry read after the DC erasing.

Also an adjacent data guarantee processing method of the present invention comprises a step of detecting that the head cannot read data of a sector of the track with a predetermined read offset amount, a step of detecting whether the predetermined track was influenced by an off track write from the adjacent track when the data cannot be read, a step of executing a retry read of the data of the sector of the adjacent track when there is influence of an off track write, a step of reading the sector which could not be read after executing an offset DC erasing of the sector of the adjacent track which influences the sector which could not be read, and a step of rewriting the sector of the adjacent track for which a retry read was executed, and the sector of the predetermined track.

According to the present invention, it is detected whether the sector is a sector which is difficult to read due to an off track write, and offset DC erasing is executed for the sector of the adjacent track where an off track write occurred even if an offset read retry is unsuccessful, so the read success ratio of the sector improves, and only that sector is rewritten.

Therefore even if the disk device is used in an environment where write faults are often detected, a drop in the read/write performance can be prevented. And since the sectors which are actually difficult to read are detected by a read check with a predetermined offset, only the sectors which are difficult to read can be rewritten, which decreases the guarantee processing time.

BRIEF DESCRIPTION OF THE DRAWINGS

FIG. 17 is a diagram depicting the operation of the data guarantee processing in FIG. 16;

DESCRIPTION OF THE PREFERRED EMBODIMENTS

Embodiments of the present invention will now be described in the sequence of disk storage device, first embodiment, second embodiment, third embodiment, fourth embodiment, fifth embodiment, and other embodiments, however the present invention is not limited to the following embodiments.

[Disk Storage Device]

Figure 1:
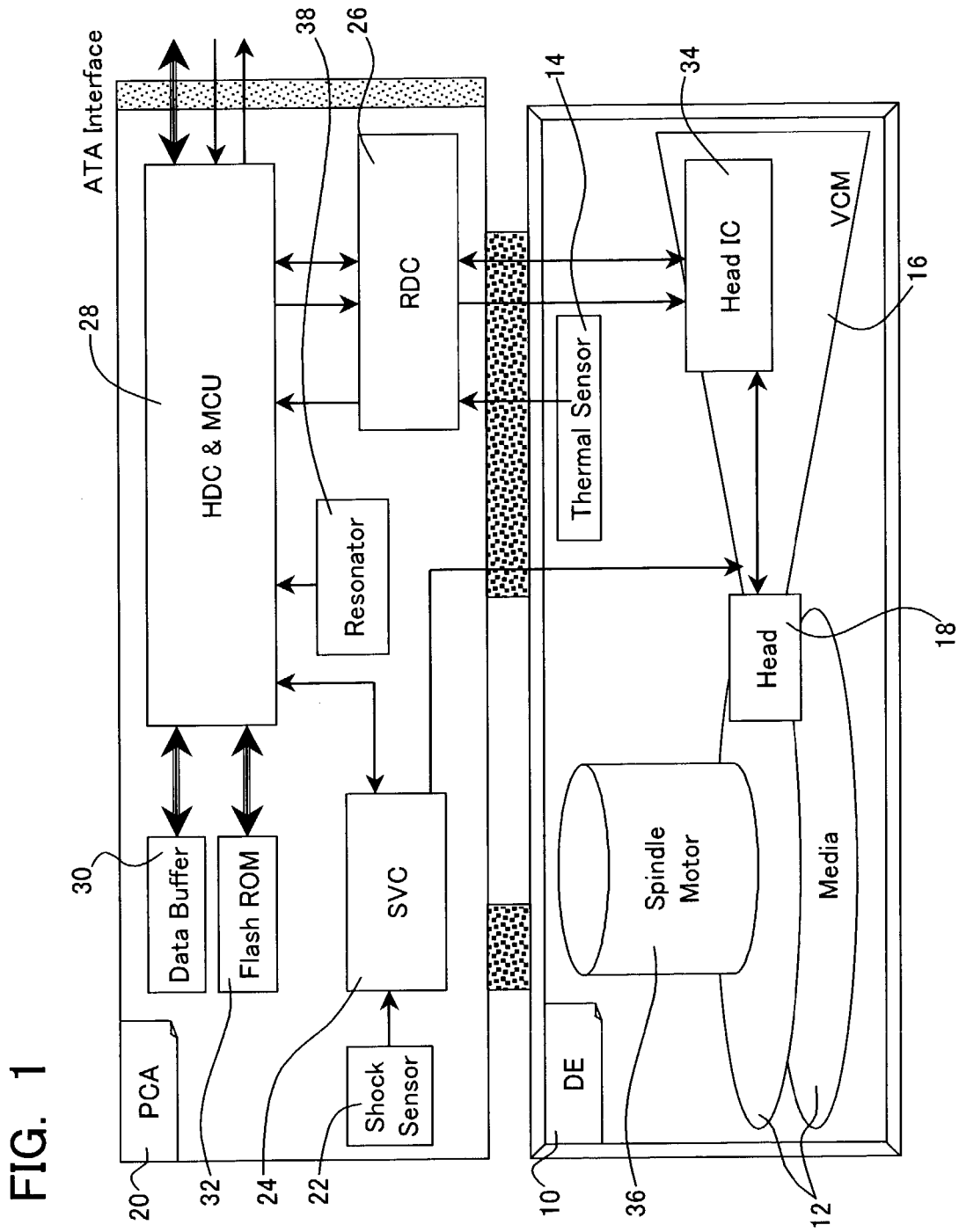
FIG. 1 is a block diagram depicting a disk storage device according to an embodiment of the present invention.

FIG. 1 is a block diagram depicting a disk storage device according to an embodiment of the present invention. FIG. 1 shows a magnetic disk device as a disk storage device. As FIG. 1 shows, a magnetic disk 12, which is a magnetic storage medium, is installed at the rotation axis of the spindle motor 36. The spindle motor 36 rotates the magnetic disk 12. The actuator 16 has a magnetic head 18 at the tip, and moves the magnetic head in a radius direction of the magnetic disk 12.

The actuator 16 is comprised of a VCM (Voice Coil Motor) that has an arm which rotates with the rotation axis as the center, a drive coil which is installed at the read end of the arm, and a suspension (gimbal) installed at the tip of the arm, and the magnetic head is installed at this suspension.

A head IC 34, which includes a write driver electrically connected with the magnetic head 18, is installed in the actuator 16. Also a temperature sensor 14, for detecting the temperature inside the enclosure 10, is installed. As FIG. 1 shows, these components are housed in the disk enclosure 10.

The magnetic head 18 is comprised of a slider, a read element (MR element) and a write element. The magnetic head 18 is configured by layering the reading element, including the magneto-resistance element, on the slider, and layering the write element, including the write coil, thereon. The core width of this magneto-resistance element corresponds to the width of the track of the magnetic disk 12, 0.3–0.4 µm for example.

A print circuit assembly 20 is installed separate from the disk enclosure 10. The print circuit assembly 20 mounts the control circuit of the magnetic disk device. This control circuit is comprised of a servo controller 24, read/write controller 26, hard disk controller/main controller 28, data buffer 30, and flash ROM 32.

Also in the print circuit assembly 20, a shock sensor 22 for detecting shock to be applied to the device, and oscillator 38, are installed. The servo controller 24 servo controls the actuator so as to position the magnetic head at a specified position of the hard disk controller/main controller 28.

The read/write controller 26 transfers the write data to the magnetic head 18 via the head IC 34, and receives the read data from the magnetic head 18. The read/write controller 26 also switches the head and controls the timing of read/write. The hard disk controller/main controller 28 executes programs, including the parameters stored in the flash ROM 24, using the data buffer 30.

The hard disk controller/main controller 28 issues head position instructions to the servo controller 24, and the servo controller 24 servo-controls the actuator according to the head position instructions, and positions the magnetic head 18 at a desired track position.

The hard disk controller/main controller 28 is connected with a host, which is not illustrated, via such an interface as an ATA (AT attached) interface, transfers the write data to the read/write controller 26 during write, and has the magnetic head 18 write the data via the head IC 34. In this way, the hard disk controller/main controller 28 sends read instructions to the read/write controller 26 during read, and the read/write controller 26 receives the read data from the magnetic head 18 via the head IC 34 according to the read instructions, and transfers the read data to the hard disk controller/main controller 28.

In a magnetic disk device having such a configuration, the hard disk controller/main controller 28 executing a program performs adjacent data guarantee processing during write and read.

Figure 2:
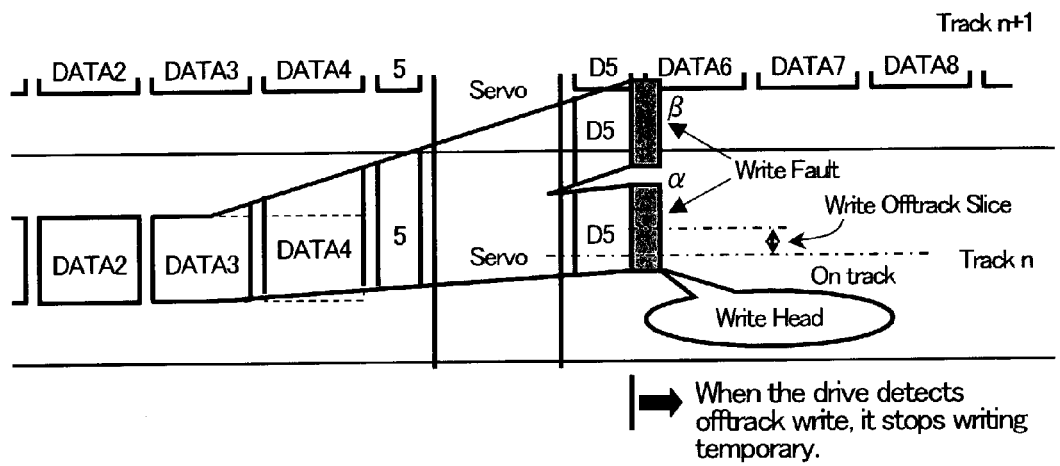
FIG. 2 is a diagram depicting an off track write detecting operation in FIG. 1.

Now the principle of the adjacent data guarantee processing of the present invention will be described. FIG. 2 is a diagram depicting a state where the write head is writing data on the track n of the magnetic disk 12.

As FIG. 2 shows, the servo controller 24 recognizes the current position of the head by reading the servo signal Servo. Since there is a delay from reading the positional information to recognizing this, the current position is actually recognized after reading the servo signal. The write off track slice is a maximum value for allowing a positional deviation of the head from the center position of the track (referred to as the on track position), which is a value derived from the characteristics of the head and the medium, and by research.

This write off track slice is set to a value whereby the read head can read the write data at the on track position without any problems, even if the write head wrote data at the offset position within the write off track slice. The write off track slice is determined considering the margins, such as the dispersion of the head.

A write fault occurs when the device (hard disk controller 28) recognizes that the position of the write head exceeded the write off track slice in the frame of the target sector during a data write. Also there are other factors which cause a write fault.

As FIG. 2 shows, a write fault is detected when the position of the write head is α or β, but most write faults occur when the position of the write head is α, which does not influence the adjacent sector (data of track n+1), as shown in FIG. 2. If a write fault is detected when the position of the write head is β, however, it is highly possible that the data of the adjacent sector is influenced.

Figure 3:
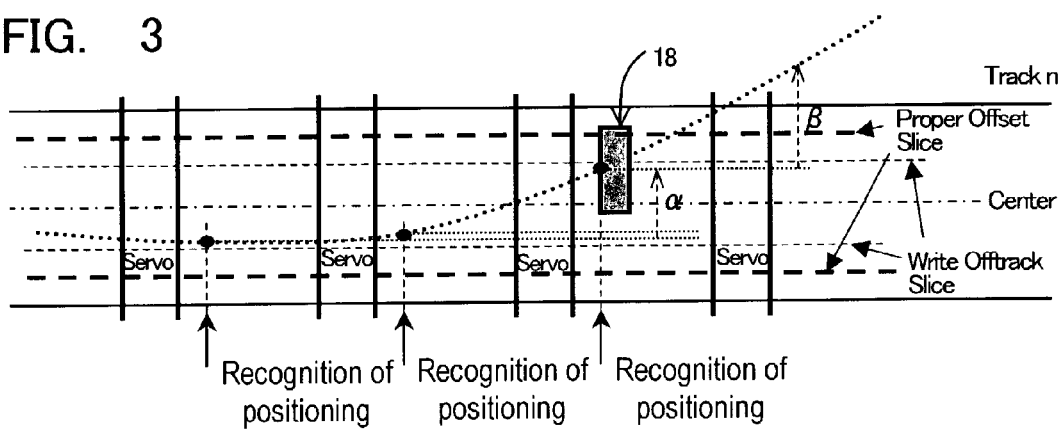
FIG. 3 is a diagram depicting another off track write detecting operation in FIG. 1.

FIG. 3 is a diagram depicting an example of write fault detection considering speed and acceleration, where the speed or acceleration of the head is calculated from information on two or three consecutive positions (servo signals), and the next positional information is estimated. When it is detected that the speed/acceleration or the next estimated position is outside the specification limit (outside the write offset slice), the device recognizes a write fault.

Figure 5:
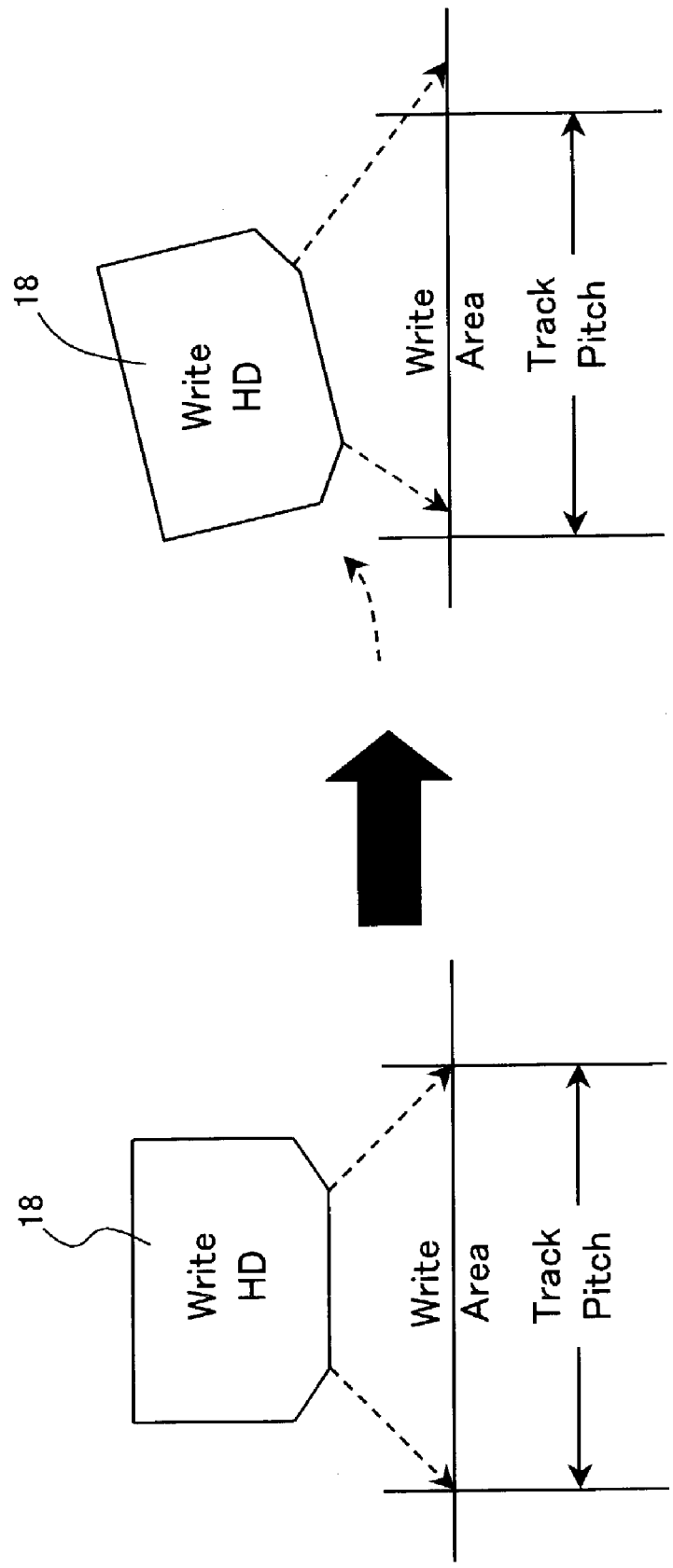
FIG. 5 is a diagram depicting an off track write status in FIG. 3.

As FIG. 5 shows, when the speed/acceleration is high, the write head inclines, and the write area expands with respect to the track pitch. In other words, it is highly possible that the adjacent sector is influenced if the acceleration is abnormal due to a certain factor.

Figure 4:
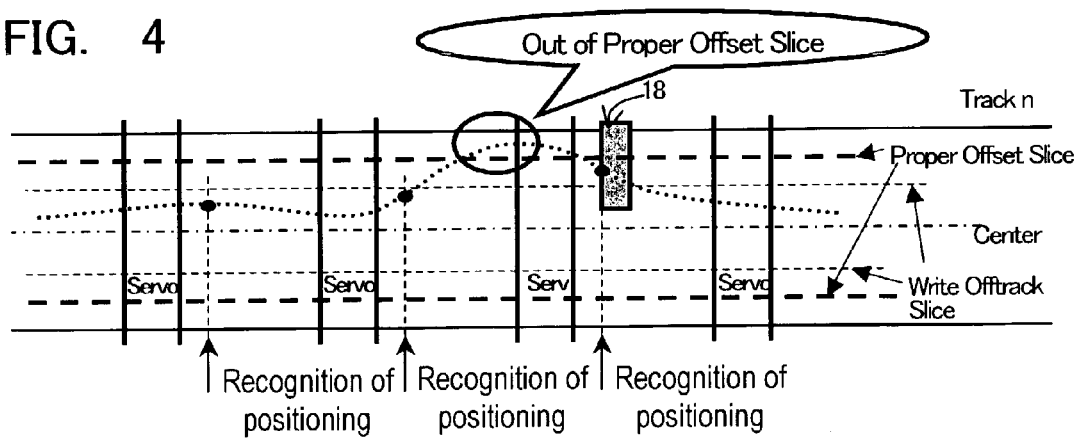
FIG. 4 is a diagram depicting an off track write status in FIG. 1.

FIG. 4 is a diagram depicting an example when the device cannot recognize the offset write outside the specification limit during write. In other words, this is a case when the head 18 severely moves within one frame. An appropriate offset slice is a write offset amount which may influence the adjacent sector.

In the case of FIG. 4, the device can detect this state as a simple write fault, but actually the adjacent sector may be influenced. Originally it was designed such that severe (high frequency) shock, where the device cannot recognize the degree of negative influence within one frame, is not supposed to happen both mechanically and in terms of head positioning control. In other words, such a case is extremely rare, and may possibly occur when shock is applied externally, and if such a case occurs and the adjacent sector is influenced, this problem is detected when the next target adjacent sector is read.

In this way, when a write fault is detected, it is further checked whether it is an off track write which influence the adjacent sector, and if it is not an off track write which influences the adjacent sector, adjacent sector guarantee processing is not executed, and if it is an off track write which influences the adjacent sector, adjacent sector guarantee processing is executed. Therefore execution of unnecessary guarantee processing can be prevented, and a drop in the performance of a magnetic disk device can be prevented.

[First Embodiment]

Figure 6:
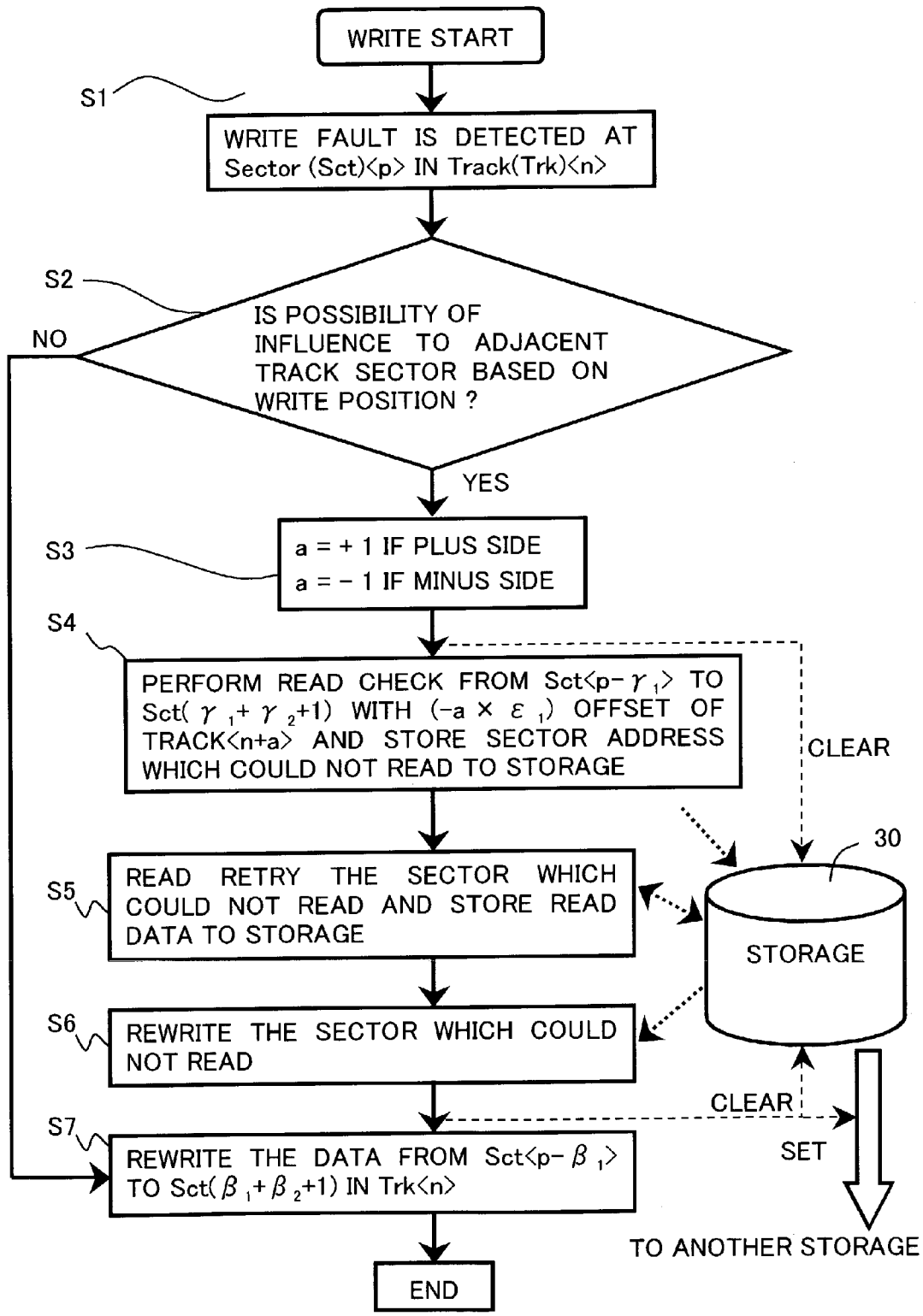
FIG. 6 is a flow chart depicting the data guarantee processing of the first embodiment of the present invention.
Figure 7:
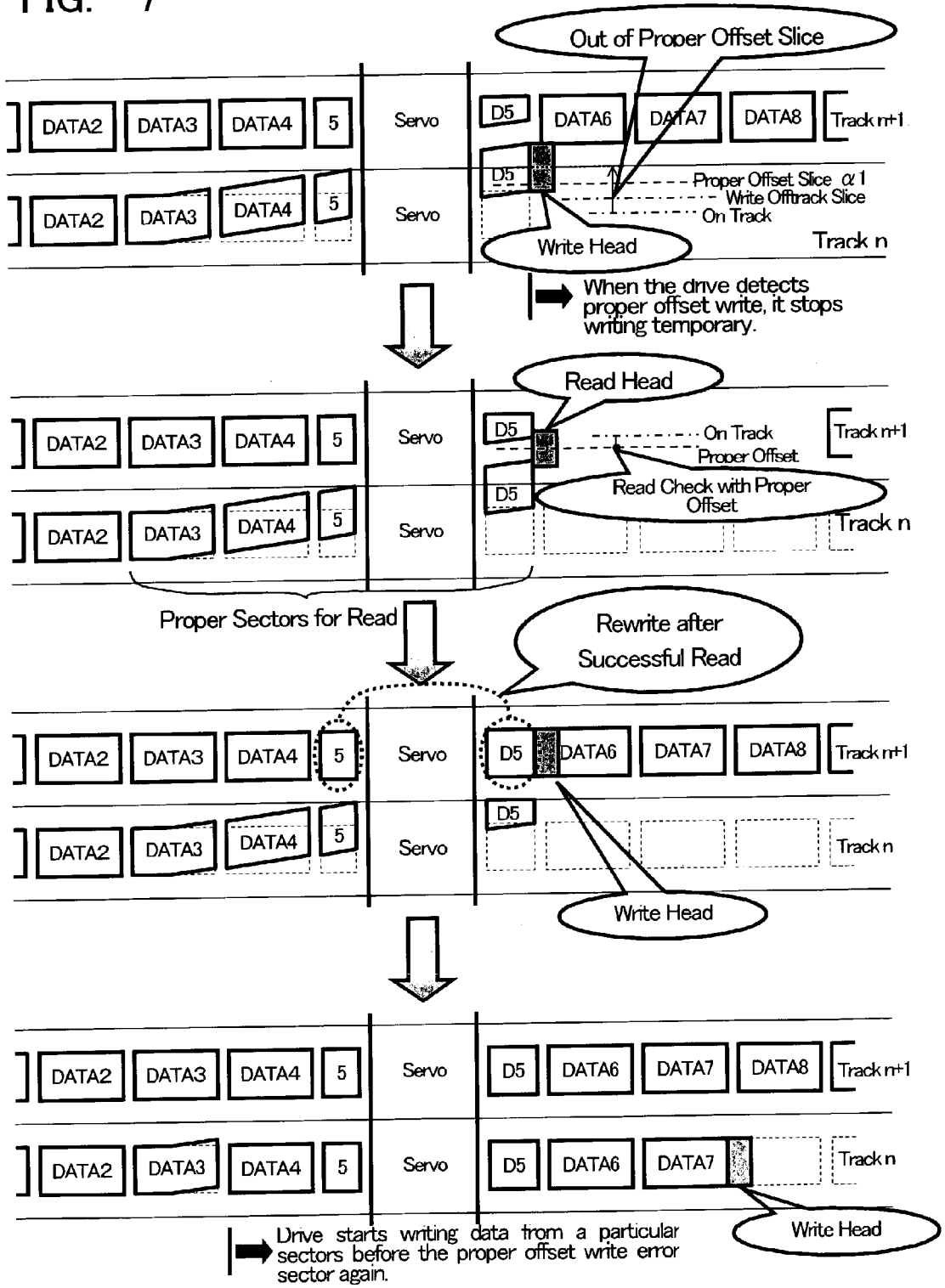
FIG. 7 is a diagram depicting the operation of data guarantee processing in FIG. 6.

FIG. 6 is a flow chart depicting the adjacent sector guarantee processing according to the first embodiment of the present invention, and FIG. 7 is a diagram depicting the operation thereof. The processing in FIG. 6 is executed by the hard disk controller/main controller 28 shown in FIG. 1.

(S1) After starting the data write operation, it is judged whether a write fault is detected. In other words, the current position of the head and the write offset slice (see FIG. 2) are compared during a data write, and it is judged whether the current position of the head exceeded the write offset slice. In the same way, the estimated position with the next sample can also be calculated from the head detection position, and it is judged whether the estimated position exceeded the write offset slice.

(S2) In the present embodiment, the adjacent sector guarantee processing is not executed even if a write fault is simply detected during a data write. In other words, it is checked whether the write position of the head when the write fault is detected is the position where an off track write is possible. For example, it is checked whether the write position of the head exceeds the specified offset amount (guarantee processing offset write slice) α1 (α1>write off track slice), which is preset, shown in FIG. 7, so as to judge the possibility of an off track write.

Also as described in FIG. 3, the possibility of an off track write may be judged by detecting whether the speed/acceleration of the head exceeded the guarantee processing Y axis speed α2/guarantee processing Y axis acceleration α3 when the write fault is detected as described in FIG. 3. At this time it is also judged whether the direction of the off track write is the plus side or the minus side of the track center. If there is no possibility of an off track write, processing advances to step S7.

(S3) When the possibility of an off track write is detected at the track n and sector p, guarantee processing is executed. If the direction of the off track write is the plus side, then the direction pointer a is set to "+1", and if the minus side, the direction pointer a is set to "−1". At this time the storage area of the buffer memory 30 is cleared.

(S4) When the possibility of an off track write is detected, the data of the adjacent sector which may have been influenced by an off track write is read with a position shift by the specified offset amount $\epsilon_1$. $\epsilon_1$ is an offset amount whereby data can be read without fail if an off track write did not occur. In other words, when the track for which a write fault is detected is track n and sector p, the (n+a) track, that is a track which may have been influenced by an off track write, is checked as to whether <γ1+γ2+1> sectors from the sector <p−γ1> can be read. Here γ1 is a number of guaranteed sectors which position before the sector p of the adjacent track, and γ2 is the number of guaranteed sectors which position after the sector p of the adjacent track.

Also this read check is executed offsetting the head position for (−a×$\epsilon_1$) from the center of the adjacent track n+a. In this case, the offset amount is (−a×ε1), so in the case of track n+1, which is the case of a=1, a read check is executed at a position where the head position is offset a×ε1 in the direction of track n from the center position of the track n+1, as shown in FIG. 7. In the case of the track n−1, which is the case of a=−1, a read check is executed at a position where the head position is offset a×ε1 in the track n direction from the center position of the track n−1.

In other words, the occurrence of an off track write in the adjacent track n+1 or n−1 (difficulty in reading data) can be detected by executing a read check at a position offset from the on track position in the direction of the track n at the adjacent track n+1 or n−1. The sector address where data could not be read during this read check is stored in the storage section (buffer) 30.

(S5) For only the sectors where the data could not be read during this check, reading is retried until the data is read. In other words, a read retry is executed in the adjacent track n+1 or n−1 with changing such read parameters as the positional offset amount of the head and the amplifier gain. If data in a sector where the data could not be read in the previous read retry can be read in this read retry, the data is temporarily stored in the storage section (buffer) 30.

(S6) As FIG. 7 shows, the data is rewritten to the sector when the data is read. By this, the sector where the data became difficult to be read due to an off track write can be recovered. After the rewrite, the storage section (buffer) 30 is cleared. This address data is stored in another buffer area as error history for failure analysis.

(S7) Then in the track n where the data was supposed to be written, the data is rewritten for (β1+β2+1) sectors from a sector at specified sectors (p−β1) before the sector p where a write fault was detected. By this, the data of the track n itself is recovered, then processing ends.

In the case of a device, including a mechanical factor or a factor of the servo track writer which tends to cause an off track write at a specific location, an off track write in a same direction occurs many times at the same location. In this case, an off track write occurs again and again in a specific adjacent sector, and it may be desirable to execute alternate processing since such a sector has risks.

For this, there may be a mechanism for storing an address where the data could not be read in a read check from the dynamic storage section to another static storage section, as described in FIG. 6. The data at the address where the data could not be read in a read check may be used again, so timing to clear the data of the dynamic storage section is not specified.

In this way, even if a write fault is detected, the adjacent track is not immediately rewritten to guarantee the data, but it is judged whether the write fault possibly caused the off track write, and if the write fault possibly caused the off track write, the sector where the data became difficult to read due to the off track write is detected, and only that sector is rewritten.

Therefore even if the disk device is used in an environment where write faults are often detected, the number of times of adjacent track data guarantee processing decreases, and the drop in the read/write performance can be prevented, and since the sectors which actually became difficult to be read are detected by a read check with a predetermined offset, only the sectors where the data is difficult to read can be rewritten, which decreases the guarantee processing time.

[Second Embodiment]

Figure 8:
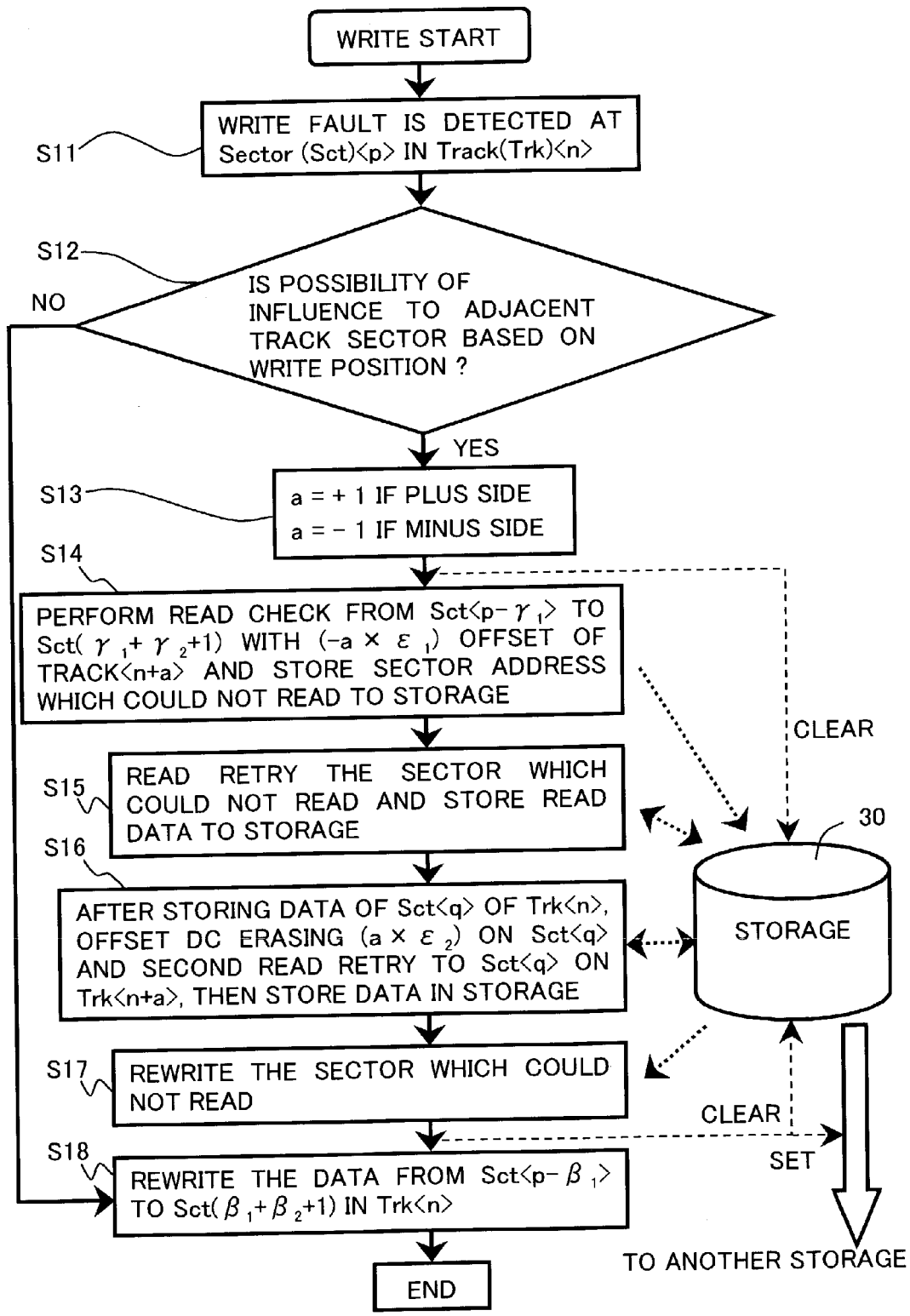
FIG. 8 is a flow chart depicting the data guarantee processing of the second embodiment of the present invention.
Figure 9:
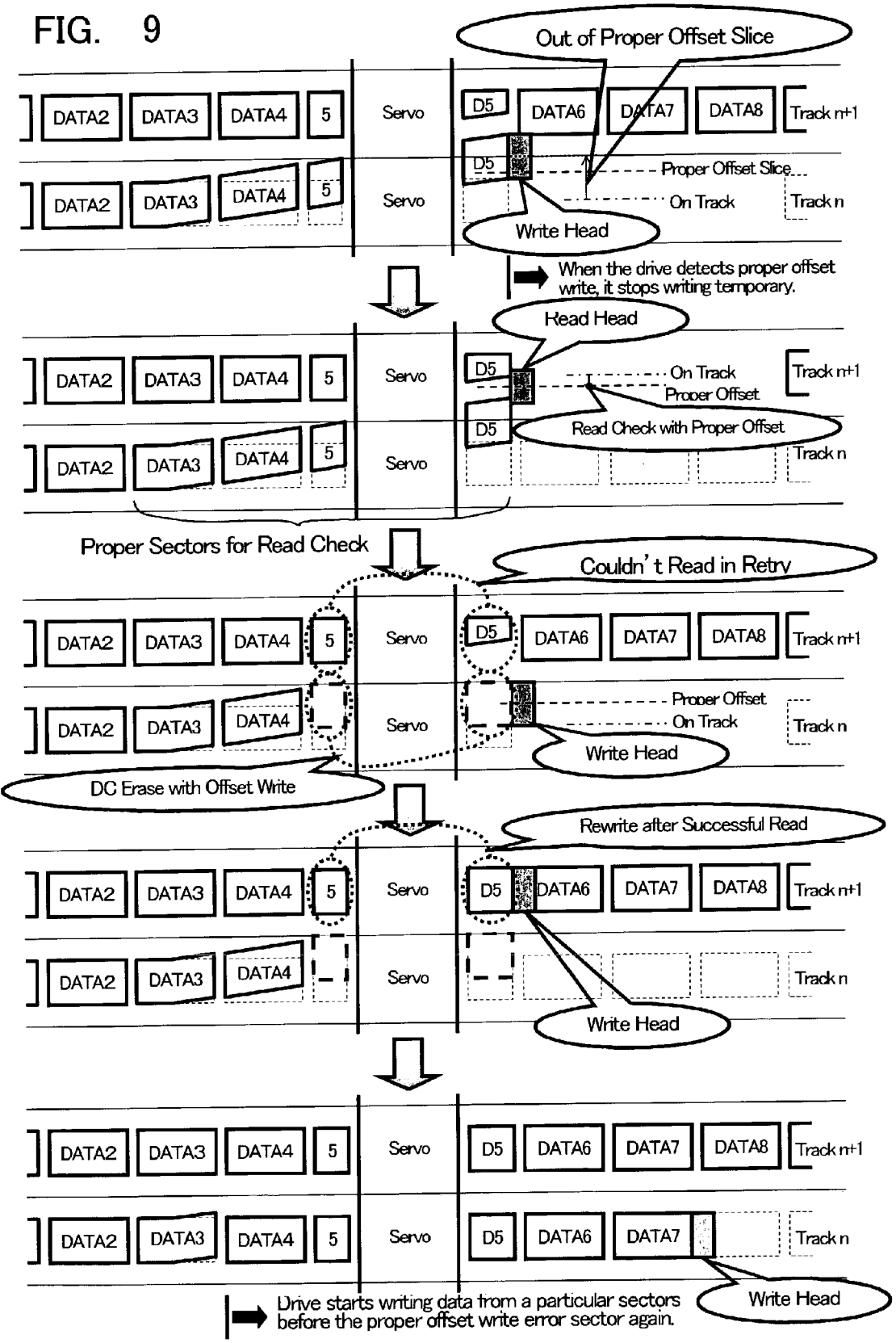
FIG. 9 is a diagram depicting the operation of the data guarantee processing in FIG. 8.
Figure 10:
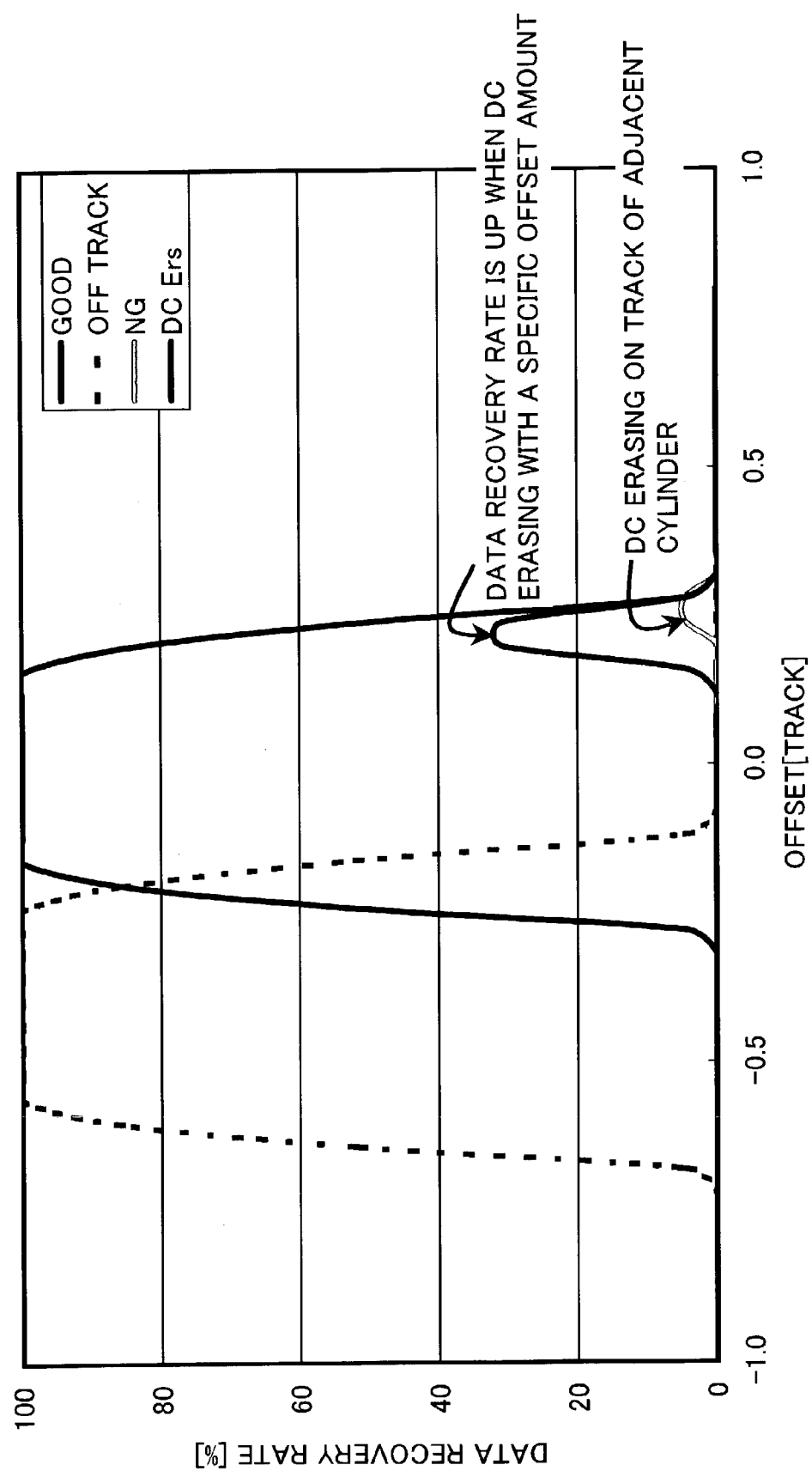
FIG. 10 is a diagram depicting the DC erasing operation of the second embodiment of the present invention.

FIG. 8 is a flow chart depicting the adjacent sector guarantee processing according to the second embodiment of the present invention, and FIG. 9 and FIG. 10 are diagrams depicting operations thereof. The processing in FIG. 8 is executed by the hard disk controller/main controller 28 in FIG. 1.

In the first embodiment, it is assumed that all data of the adjacent sector which was influenced by an off track write can be recovered by a read retry after a read check. In the second embodiment, handling when the data of the adjacent sector cannot be recovered by a read retry is added.

FIG. 10 is a diagram depicting an improvement in the recovery rate of the data where an off track write occurred by DC (Direct Current) erasing. In FIG. 10, the data recovery rate is high for ±0.3 tracks at the left and right of offset (track)=0.0. If an overwritten sector (off track written sector) is DC erased when the off track write occurred during writing in track=−1.0, shown in FIG. 10 by a dotted line, and the data in track=0.0 is hardly read, it is expected that the recovery rate improves.

In this case, the recovery rate of the adjacent sector hardly improves, even if the off track written sector is DC erased on track (track=−1.0), as shown in FIG. 10. If offset $\epsilon_2$ is provided at the plus side, which is the adjacent sector side (track=0.0) and the off track written sector is DC erased, the off track written overwrite is deleted and the data recovery rate improves. By this processing, a sector which cannot be read due to an off track write can be read, and the data which is hard to read can be recovered by rewriting data.

The processing flow in FIG. 8 will now be described with reference to FIG. 9.

(S11) After starting the data write operation, it is judged whether a write fault is detected. In other words, the current position of the head and the write offset slice (see FIG. 2) are compared during the data write, and it is judged whether the current position of the head exceeded the write offset slice. In the same way, the estimated position with the next sample can also be calculated from the head detection position, and it is judged whether the estimated position exceeded the write offset slice.

(S12) In the present embodiment as well, the adjacent sector guarantee processing is not executed even if a write fault is simply detected during a data write. In other words, it is checked whether the write position of the head when a write fault is detected is the position where an off track write is possible. For example, it is checked whether the write position of the head exceeds the specified offset amount (guarantee processing offset write slice) $\alpha 1$ ($\alpha 1$>write off track slice), which is preset, shown in FIG. 9, so as to judge the possibility of an off track write. In the same way, as described in FIG. 3, the possibility of an off track write may be judged by detecting whether the speed/acceleration of the head exceeded the guarantee processing Y axis speed $\alpha 2$/guarantee processing Y axis acceleration a3 when a write fault is detected, as described in FIG. 3. At this time, it is also judged whether the direction of the off track write is either the plus side or the minus side of the track center. If there is no possibility of an off track write, processing advances to step S18.

(S13) When the possibility of an off track write is detected at the track n and sector p, guarantee processing is executed. If the direction of the off track write is the plus side, the direction pointer a is set to "+1", and if the minus side, the direction pointer a is set to "−1". At this time the storage area of the buffer memory 30 is cleared.

(S14) When the possibility of an off track write is detected, the data of the adjacent sector which may have been influenced by an off track write is read, with a position shift by the specified offset amount $\epsilon_1$. $\epsilon_1$ is the offset amount whereby data can be read without fail if an off track write did not occur. In other words, when the track for which a write fault is detected is the track n and sector p, (n+a) track, that is a track which may have been influenced by an off track write is checked whether <$\gamma 1+\gamma 2+1$> sectors from the sector <p−$\gamma 1$> can be read. Here $\gamma 1$ is a number of guaranteed sectors which position before the sector p of the adjacent track, and $\gamma 2$ is a number of guaranteed sectors which position after the sector p of the adjacent track.

Also this read check is executed offsetting the head position for (−a×$\epsilon 1$) from the center of the adjacent track n+a. In this case, the offset amount is (−a×$\epsilon 1$), so in the case of the track n+1, which is the case of a=1, a read check is executed at a position where the head position is offset for a×$\epsilon 1$ in the direction of the track n from the center position of the track n+1, as shown in FIG. 9. In the case of the track n−1, which is the case of a=−1, a read check is executed at a position where the head position is offset for a×$\epsilon 1$ in the track n direction from the center position of the track n−1.

In other words, the occurrence of an off track write in the adjacent track n+1 or n−1 (difficulty in reading data) can be detected by executing a read check at a position offset from the on track position in the direction of the track n at the adjacent track n+1 or n−1. The sector address where the data could not be read during this read check is stored in the storage section (buffer) 30.

(S15) For only the sectors where the data could not be read during this check, reading is retried until the data is read. In other words, a read retry is executed in the adjacent track n+1 or n−1 with changing such read parameters as the positional offset amount of the head and the amplifier gain. If the data in a sector where the data could not be read in the previous read retry can be read in this read retry, the data is temporarily stored in the storage section (buffer) 30.

(S16) For the sector <q> where the data could not be read in the read retry in step S15, on the other hand, the data in the sector <q> of the track n where the off track write occurred is held, then the head position is a×$\epsilon 2$ offset in the direction of the track where the off track write occurred, and the sector <q> of the track n is DC erased. Then the data is read by a second read retry of the sector <q> of the track n+a where the data could not be read. If the data in the sector where the data could not be read in the previous read retry can be read in this read retry, the data is temporarily stored in the storage section (buffer) 30.

(S17) As FIG. 9 shows, the data is rewritten in the sector when the data is read. By this, the sector where the data became difficult to read due to an off track write can be recovered. After the rewrite, the storage section (buffer) 30 is cleared. This data is stored in another buffer area as error history for failure analysis.

(S18) Then in the track n where the data is supposed to be written, the data is rewritten for a ($\beta 1+\beta 2+1$) sectors from a sector at a specified sectors (p−$\beta 1$) before the sector p where the write fault was detected, and for the sector <q>. By this, the data of the track n itself is recovered. Then processing ends.

In the case of a device, including a mechanical factor or a factor of the servo track writer which tends to cause an off track write at a specific location, an off track write in a same direction occurs many times at the same location. In this case, an off track write occurs again and again in a specific adjacent sector, and it may be desirable to execute alternate processing since such a sector has risks.

For this, there may be a mechanism for storing an address where the data could not be read in a read check from the dynamic storage section to another static storage section, as described in FIG. 6. The data at the address where the data could not be read in a read check may be used again, so timing to clear the data of the dynamic storage section is not specified.

In this example as well, even if a write fault is detected, the adjacent track is not immediately rewritten to guarantee the data but it is judged whether the write fault possibly caused the off track write, and if the write fault possibly caused the off track write, the sector where the data became difficult to read due to the off track write is detected, and only that sector is rewritten.

Therefore even if the disk device is used in an environment where write faults are often detected, the number of times of adjacent track data guarantee processing decreases, and a drop in the read/write performance can be prevented, and since the sectors which actually became difficult to read are detected by a read check with a predetermined offset, only the sectors where the data is difficult to read can be rewritten, which decreases the guarantee processing time.

Also even in the case when the data of the track where an off track write occurred can hardly be read, the off track written overwrite is erased by offsetting the head $\epsilon 2$ to the adjacent sector side, that is the plus side, and DC erasing the off track written sector, so the data recovery rate improves. By this processing, the data in the sector which could not be read due to an off track write can be read, and the data which is difficult to read can be recovered by rewriting the data.

[Third Embodiment]

Guarantee processing when an off track write is detected during a read will now be described. As mentioned above, data is supposed to be written only within a write off track slice. The data written within the write off track slice is supposed to be read on track. But if data is written in a condition where the write performance drops (e.g. low temperature), the offset margin may decrease below the design value. In this case, an offset read is required to read the data.

During a read, the head is reading the data while shaking within the specification limit. Therefore even if an offset write within the write off track slice is executed, the data is still difficult to read during an on track read. In this case as well, the data can be read without problem by reading the data by offsetting a little. This is the major cause of cases when the data can be recovered by an offset read retry, where data can be recovered with a small offset amount.

However when one side of the data is erased by an off track write, the data cannot be read unless the offset amount is high. In other words, by checking the offset amount at retry which could recover the data, the possibility of an off track write can be estimated. Therefore even if an off track write outside the specification limit cannot be detected for any reason, an off track write can be detected during reading, and data guarantee processing can be executed.

Figure 11:
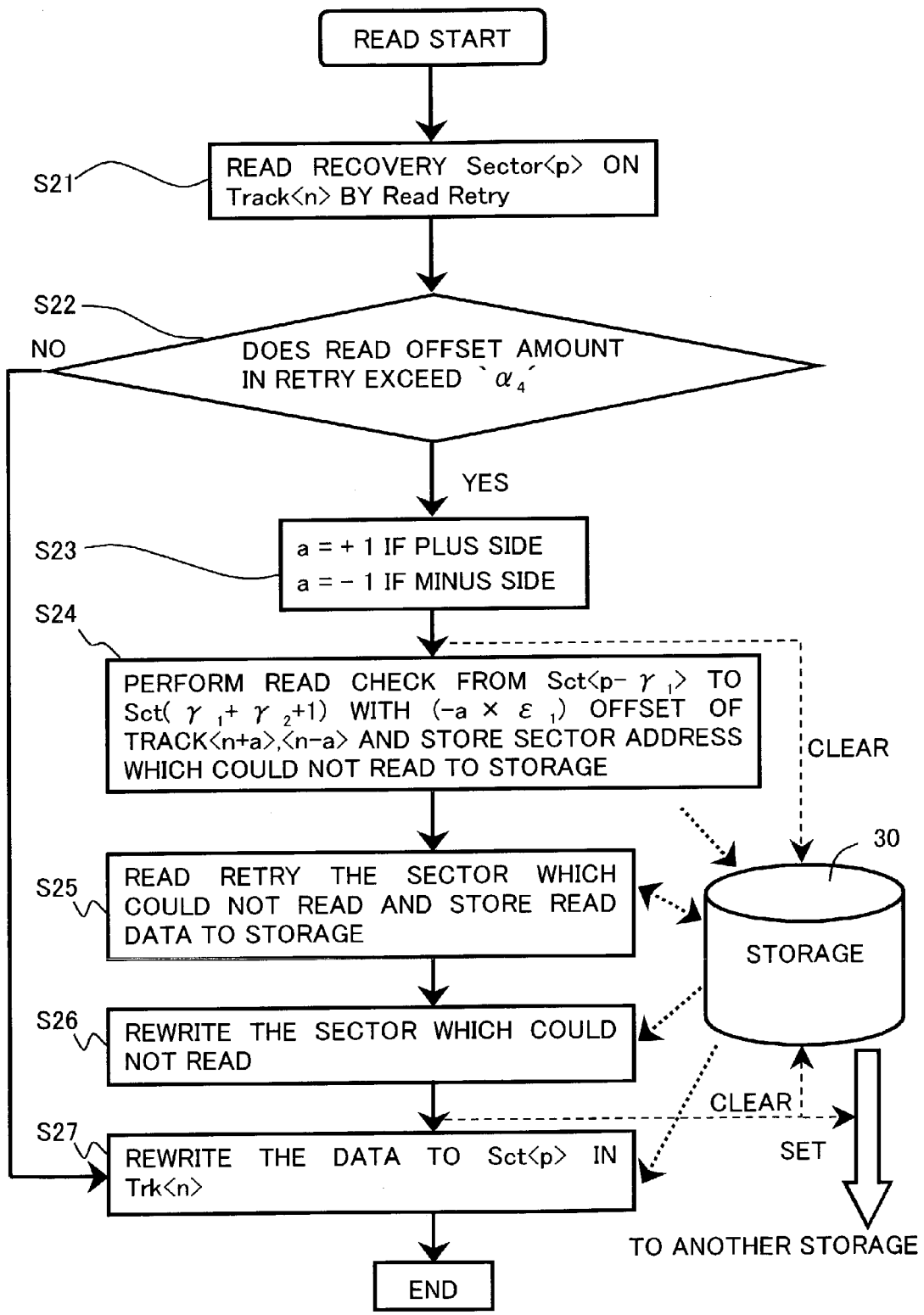
FIG. 11 is a flow chart depicting the data guarantee processing of the third embodiment of the present invention.
Figure 12:
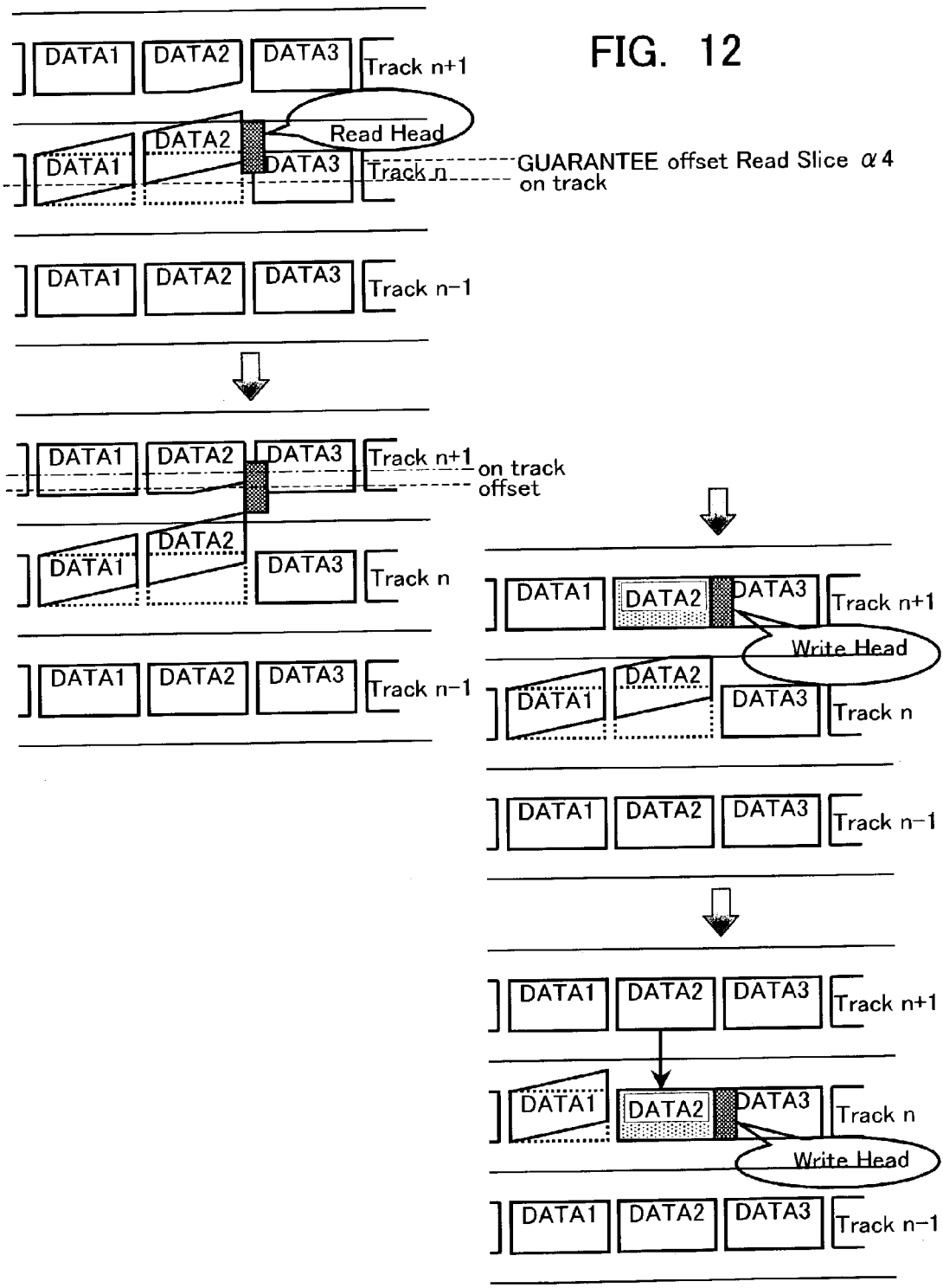
FIG. 12 is a diagram depicting the operation of the data guarantee processing in FIG. 11.
Figure 13:
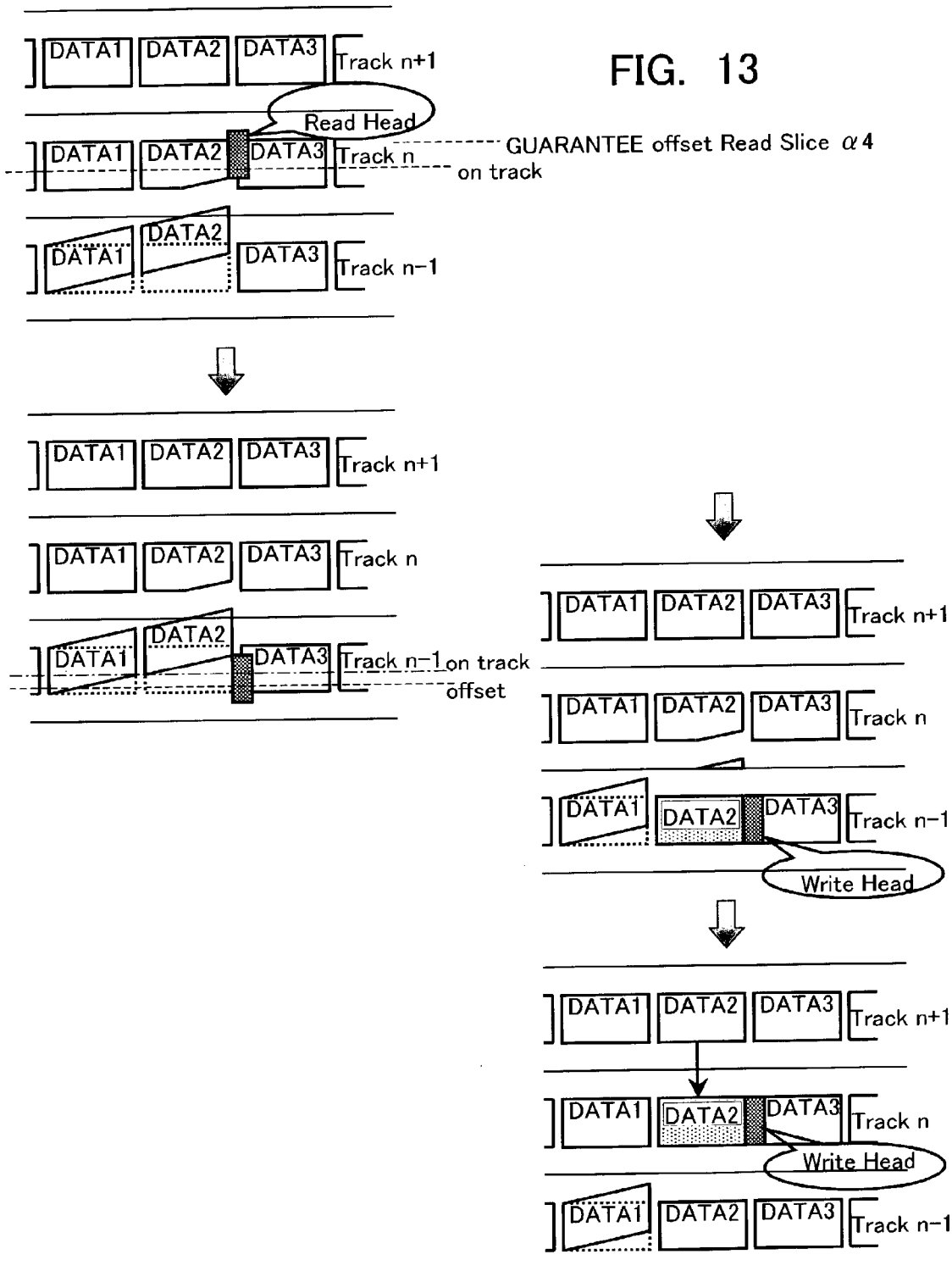
FIG. 13 is a diagram depicting another operation of the data guarantee processing in FIG. 11.

FIG. 11 is a flow chart depicting the adjacent sector guarantee processing according to the third embodiment of the present invention, and FIG. 12 and FIG. 13 are diagrams depicting the operations thereof. The processing in FIG. 11 is executed by the hard disk controller/main controller 28 in FIG. 1.

(S21) After starting the data read operation, read retry was executed, and the data of the sector p in the track n was recovered by the read retry.

(S22) According to the present embodiment, adjacent sector guarantee processing is not executed even if a read retry with an offset is simply detected. In other words, it is checked whether the sector may have caused or received an off track write from the read offset amount of the head at the retry when the data could be recovered by a read retry. For example, it is checked whether the read offset amount of the head exceeds the specified offset amount (guarantee processing offset read slice) $\alpha 4$ which is preset, shown in FIG. 12 and FIG. 13, to judge the possibility of an off track write. At this time, it is also judged whether the off track write direction is to the plus side or minus side of the track center. If there is no possibility of an off track write, processing ends.

(S23) When the possibility of an off track write is detected by the read offset amount at the sector p of the track n, guarantee processing is executed. If the direction of the off track write is the plus side, the direction pointer a is set to "+1", and if the minus side, the direction pointer a is set to "−1". At this time, the storage area of the buffer memory 30 is cleared.

(S24) When the possibility of an off track write is detected, the data of the adjacent sector, which may have been influenced by an off track write, and the adjacent sector which received an off track write are read with a position shift by the specified offset amount $\epsilon_1$. $\epsilon_1$ is the offset amount whereby the data can be read without fail if an off track write did not occur. In other words, when the track for which an off track write may have occurred according to the read offset amount is in the track n and the sector p, (n−a) and (n+a) tracks, that is tracks which may have caused an off track write or are influenced by the off track write are checked whether <γ1+γ2+1> sectors from the sector <p−γ1> can be read. Here γ1 is a number of guaranteed sectors which position before the sector p of the adjacent track, and γ2 is a number of guaranteed sectors which position after the sector p of the adjacent track.

Also this read check is executed offsetting the head position for (−a×$\epsilon$1) from the centers of the adjacent tracks n−a and n+a. In this case, the offset amount is (−a×$\epsilon$1), so in the case of the track n+1, which is the case of a=1, a read check is executed at a position where the head position is offset for a×$\epsilon$1 in the direction of the track n from the center position of the track n+1, as shown in FIG. 12. In the case of the track n−1, which is the case of a=−1, a read check is executed at a position where the head position is offset for a×$\epsilon$1 in a direction away from the track n from the center position of the track n−1.

In other words, whether an off track write occurred in the adjacent track n+1 (difficulty in reading data) due to a write fault of the track n can be detected by executing a read check in the adjacent track n+1 at a position offset from the on track position in the direction of the track n, as shown in FIG. 12. Also whether an off track write occurred in the track n due to an off track write in the adjacent track n−1 during an offset read of the track n can be detected by executing a read check in the adjacent track n−1 at a position offset in the direction away from the track n, as shown in FIG. 13. The sector address where data could not be read during this read check is stored in the storage section (buffer) 30.

(S25) For only the sectors where the data could not be read during this check, reading is retried until the data is read. In other words, a read retry is executed in the adjacent track n+1 or n−1 with changing such read parameters as the positional offset amount of the head and the amplifier gain. If the data in the sector where the data could not be read in the previous read retry can be read in this read retry, the data is temporarily stored in the storage section (buffer) 30.

(S26) As FIG. 12 and FIG. 13 show, the data is rewritten in the sector when the data is read. By this, the sector where the data became difficult to read due to an off track write can be recovered. After the rewrite, the storage section (buffer) 30 is cleared. This data is stored in another buffer area as error history for failure analysis.

(S27) Then in the track n where the data is supposed to be read, the data of the detected sector p is rewritten. By this, the data of the track n itself is recovered. Then processing ends.

In the case of a device including a mechanical factor or factor of the servo track writer which tends to cause an off track write at a specific location, an off track write in a same direction occurs many times at the same location. In this case, an off track write occurs again and again in a specific adjacent sector, and it may be desirable to execute alternate processing since such a sector has risks.

For this, there may be a mechanism for storing an address where the data could not be read in a read check from the dynamic storage section to another static storage section, as described in FIG. 11. The data at the address where the data could not be read in a read check may be used again, so timing to clear the data of the dynamic storage section is not specified.

In this way, even if an offset read retry is executed, the adjacent track is not rewritten to guarantee the data immediately, but it is judged whether the read retry possibly caused the off track write, and if the read retry possibly caused the off track write, the sector where the data became difficult to be read due to the off track write is detected, and only that sector is rewritten.

Therefore even if the disk device is used in an environment where write faults are often detected, the number of times of adjacent track data guarantee processing decreases, and a drop in the read/write performance can be prevented, and since the sectors which became actually difficult to read are detected by a read check with a predetermined offset, only the sectors which became difficult to be read can be rewritten, which decreases the guarantee processing time.

[Fourth Embodiment]

There is a case when the sector which influenced or was influenced may not be read, even if the data could be recovered by an offset read. In the present invention, therefore an offset DC erase in the second embodiment is added to the third embodiment so as to improve the read recovery rate.

Figure 14:
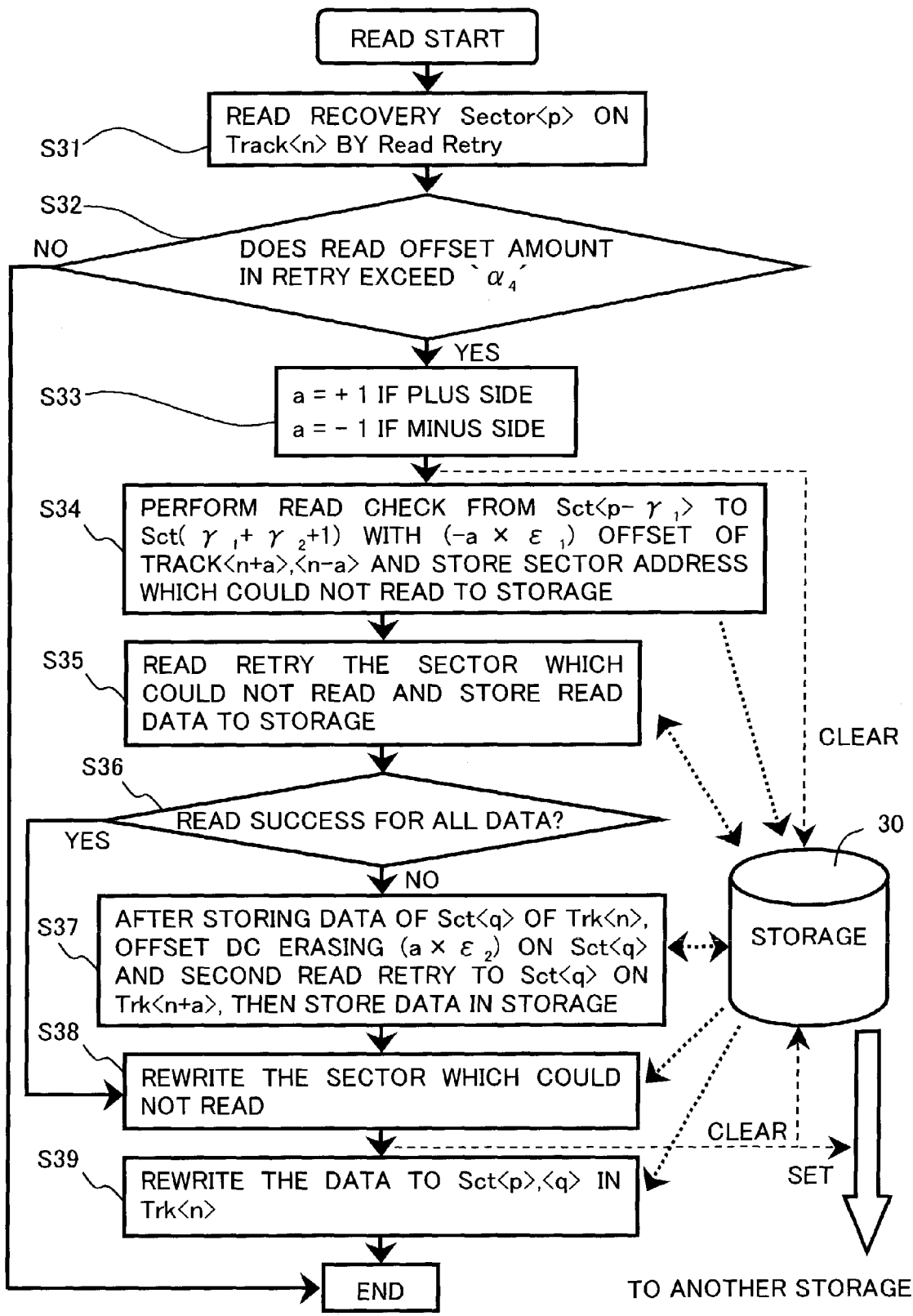
FIG. 14 is a flow chart depicting the data guarantee processing of the fourth embodiment of the present invention.
Figure 15:
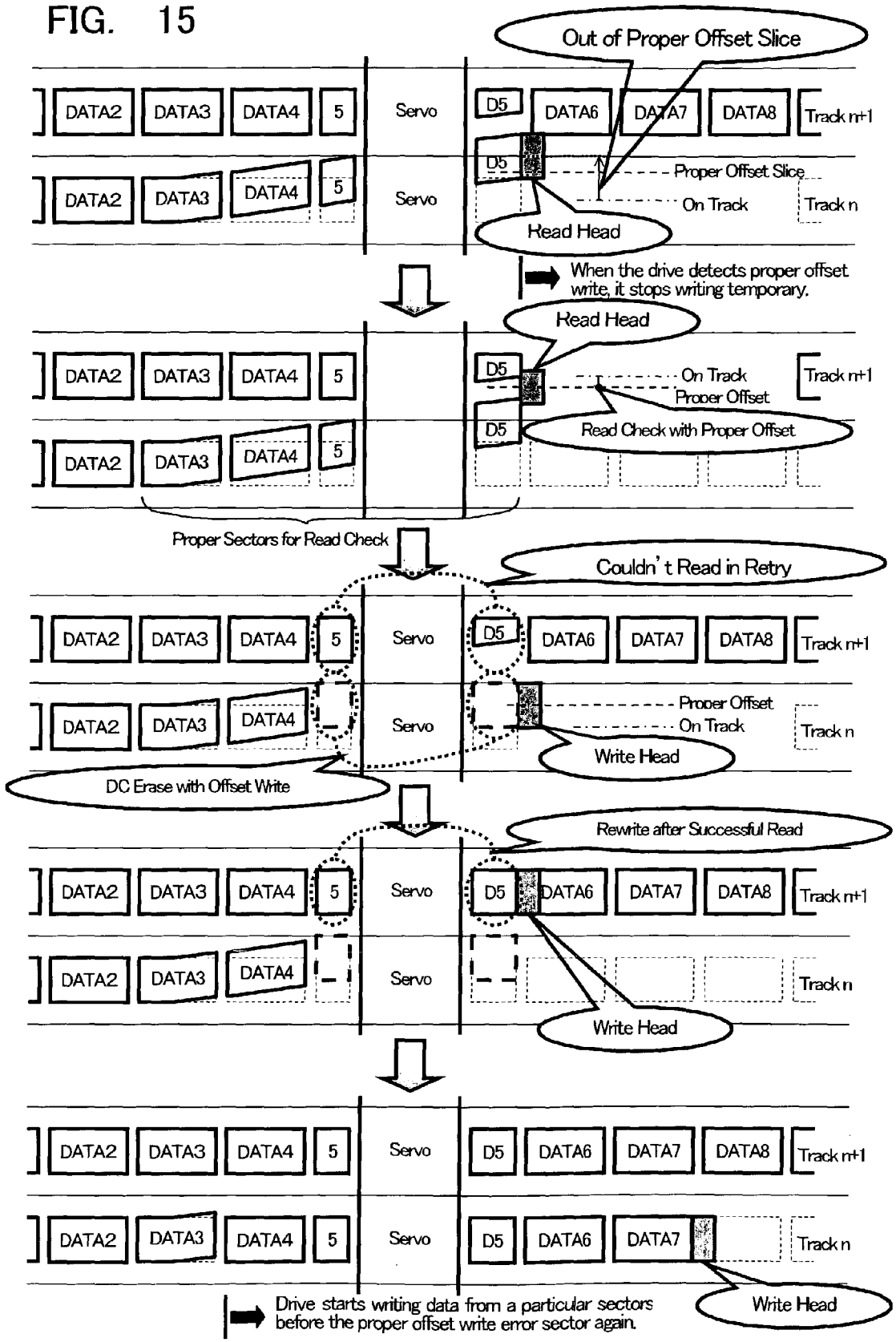
FIG. 15 is a diagram depicting the operation of the data guarantee processing in FIG. 14.

FIG. 14 is a flow chart depicting the adjacent sector guarantee processing according to the fourth embodiment of the present invention, and FIG. 15 is a diagram depicting the operation thereof. The processing in FIG. 14 is executed by the hard disk controller/main controller 28 in FIG. 1.

(S31) After starting the data read operation, a read retry was executed, and the data of the sector p in the track n was recovered by the read retry.

(S32) According to the present embodiment as well, adjacent sector guarantee processing is not executed even if a read retry with offset is simply detected. In other words, it is checked whether the sector possibly caused or received an off track write from the read offset amount of the head at the retry when the data could be recovered by the read retry. For example, it is checked whether the read offset amount of the head exceeds the specified offset amount (guarantee processing offset read slice) α4 which is preset, shown in FIG. 12 and FIG. 13, to judge the possibility of an off track write. At this time, it is also judged whether the off track write direction is to the plus side or the minus side of the track center. If there is no possibility of an off track write, processing ends.

(S33) When the possibility of an off track write is detected by the read offset amount at the sector p of the track n, guarantee processing is executed. If the direction of the off track write is the plus side, the direction pointer a is set to "+1", and if the minus side, the direction pointer a is set to "−1". At this time, the storage area of the buffer memory 30 is cleared.

(S34) When the possibility of an off track write is detected, the data of the adjacent sector which may have been influenced by an off track write, and the adjacent sector which received the off track write are read with position shift by the specified offset amount $\epsilon_1$. $\epsilon_1$ is the offset amount whereby the data can be read without fail if an off track write did not occur. In other words, when the track for which an off track write may have occurred according to the read offset amount is in the track n and the sector p, (n−a) and (n+a) tracks, that is tracks which may have caused an off track write or are influenced by the off track write are checked whether <γ1+γ2+1> sectors from the sector <p−γ1> can be read. Here γ1 is a number of guaranteed sectors which position before the sector p of the adjacent track, and γ2 is a number of guaranteed sectors which position after the sector p of the adjacent track.

Also this read check is executed offsetting the head position for (−a×ϵ1) from the centers of the adjacent tracks n−a and n+a. In this case, the offset amount is (−a×ϵ1), so in the case of the track n+1, which is the case of a=1, a read check is executed at a position where the head position is offset for a×ϵ1 in the direction of the track n from the center position of the track n+1. In the case of the track n−1, which is the case of a=−1, a read check is executed at a position where the head position is offset for a×ϵ1 in a direction away from the track n from the center position of the track n−1.

In other words, whether an off track write occurred in the adjacent track n+1 (difficulty in reading data) due to a write fault of the track n can be detected by executing a read check in the adjacent track n+1 at a position offset from the on track position in the direction of the track n, as shown in FIG. 15. Also whether an off track write occurred in the track n due to an off track write in the adjacent track n−1 during an offset read of the track n can be detected by executing a read check in the adjacent track n−1 at a position offset in the direction away from the track n. The sector address where data could not be read during this read check is stored in the storage section (buffer) 30.

(S35) For only the sectors where the data could not be read during this check, reading is retried until the data is read. In other words, a read retry is executed in the adjacent track n+1 or n−1 with changing such read parameters as the positional offset amount of the head and the amplifier gain, as shown in FIG. 15. If the data in the sector where the data could not be read in the previous read retry can be read in this read retry, the data is temporarily stored in the storage section (buffer) 30.

(S36) It is judged whether the data read succeeded for all the sectors which could not be read, and if the data read succeeded for all the sectors which could not be read, processing advances to step S38.

(S37) When the data of all the sectors could not be read in step S35, on the other hand, for the sector <q> where data could not be read in the read retry in step S35, data in the sector <q> in the track n is held, then the head position is offset for a×ϵ2 in the direction of the track where an off track write occurred, and the sector <q> of the track n is DC erased. Then the data is read by executing a second read retry of the sector <q> of the track n+a where data could not be read. If data in the sector where the data could not be read in the previous read retry can be read in this read retry, the data is temporarily stored in the storage section (buffer) 30.

(S38) The data is rewritten in the sector at the point when the data which could not be read can be read by a read check. By this, the sector where the data became difficult to be read due to an off track write can be recovered. After the rewrite, the storage section (buffer) 30 is cleared. This data is stored in another buffer area as error history for failure analysis.

(S39) Then in the track n where the data is supposed to be written, the data of the detected sector p is rewritten. By this, the data of the track n itself is recovered. Then processing ends.

In this way, when an off track write outside the specification limit was not detected for any reason, the sector which caused the off track write and the adjacent sector which is influenced cannot be recovered unless the data is read with offsetting the head for a specified amount or more. In other words, if a retry is attempted for several times when the data cannot be read by a normal read (on track read), and the data can be read by an offset read with a specified amount or more, it is highly possible that the sector received or caused an off track write. To recover this data which is difficult to read, a read check is executed for the track itself and adjacent sectors and the sectors before and after the adjacent sectors. And sectors with a check error are read by a read retry, then the data is rewritten. By this, the status where the data cannot be read at all can be prevented.

Also since a DC erase is added during adjacent sector recovery processing (rewriting after a data read succeeded), the data read success rate is further improved.

[Fifth Embodiment]

Figure 16:
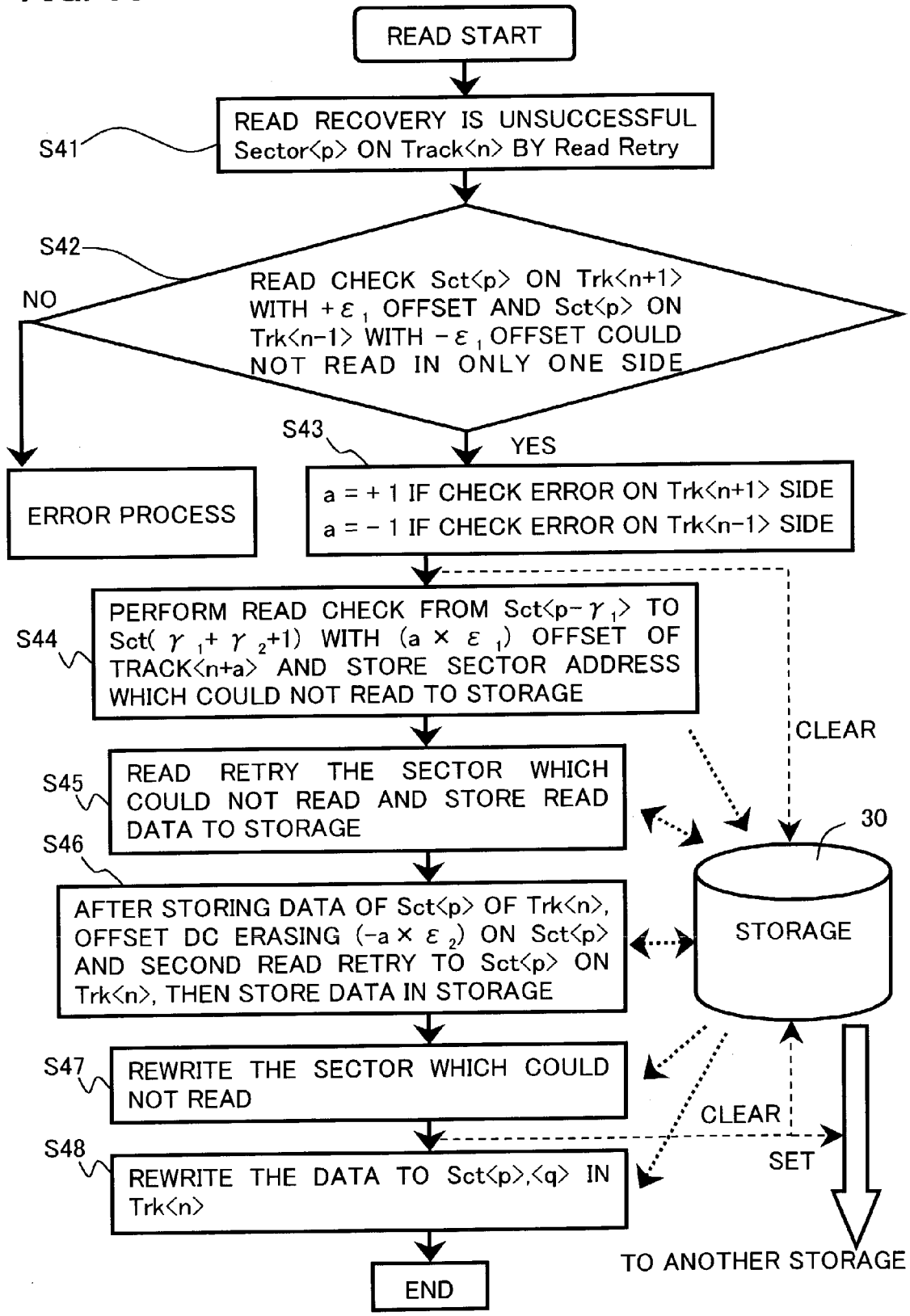
FIG. 16 is a flow chart depicting the data guarantee processing of the fifth embodiment of the present invention.
Figure 18:
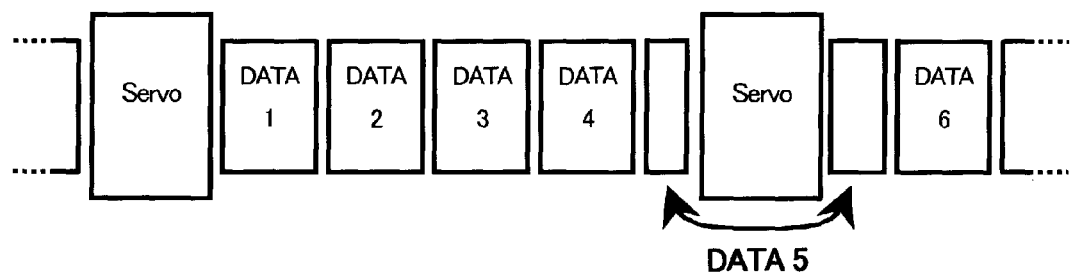
FIG. 18 is a diagram depicting the sector format of the magnetic disk.
Figure 19:
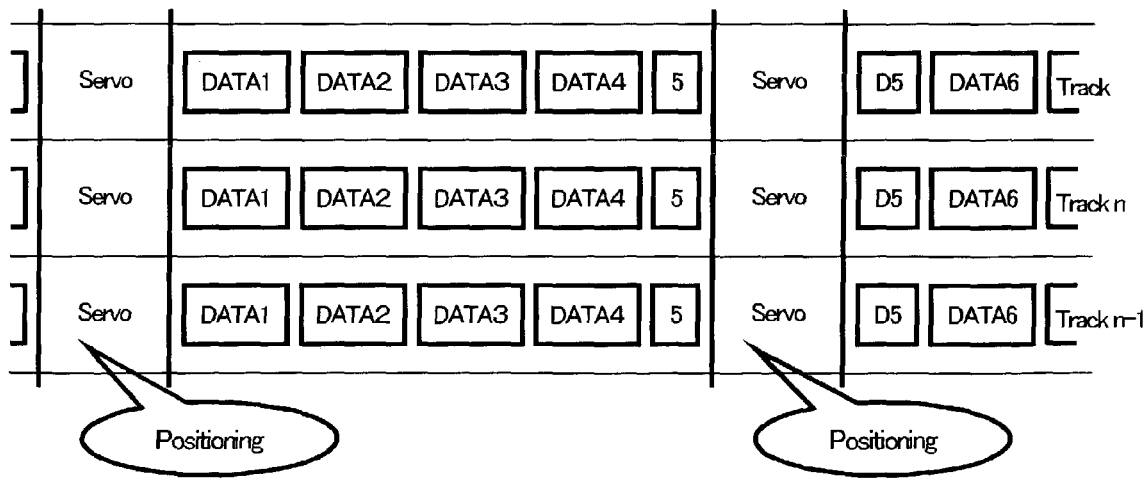
FIG. 19 is a diagram depicting the write format of the magnetic disk.
Figure 20:
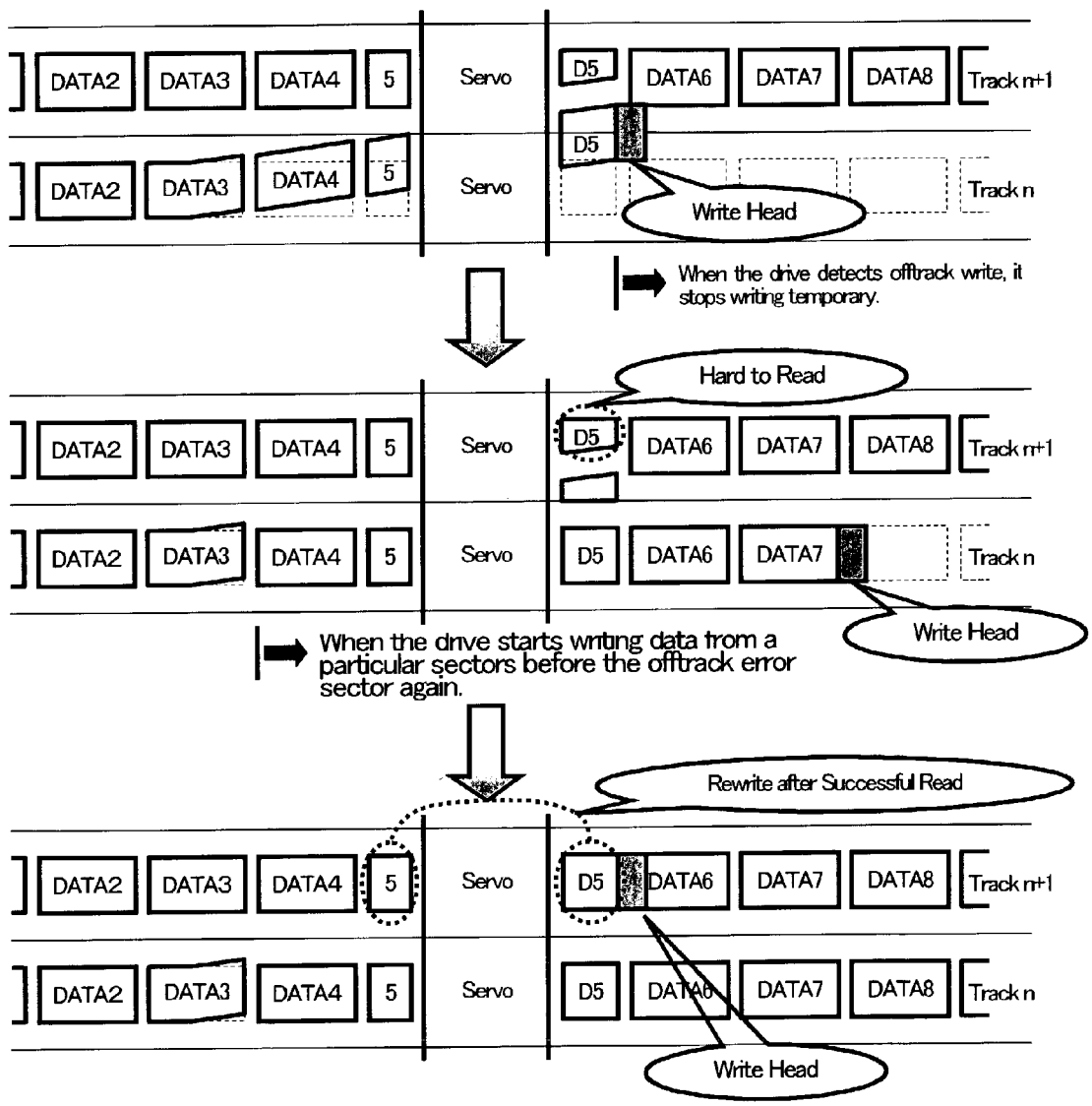
FIG. 20 is a diagram depicting conventional data guarantee processing at a write fault.
Figure 21:
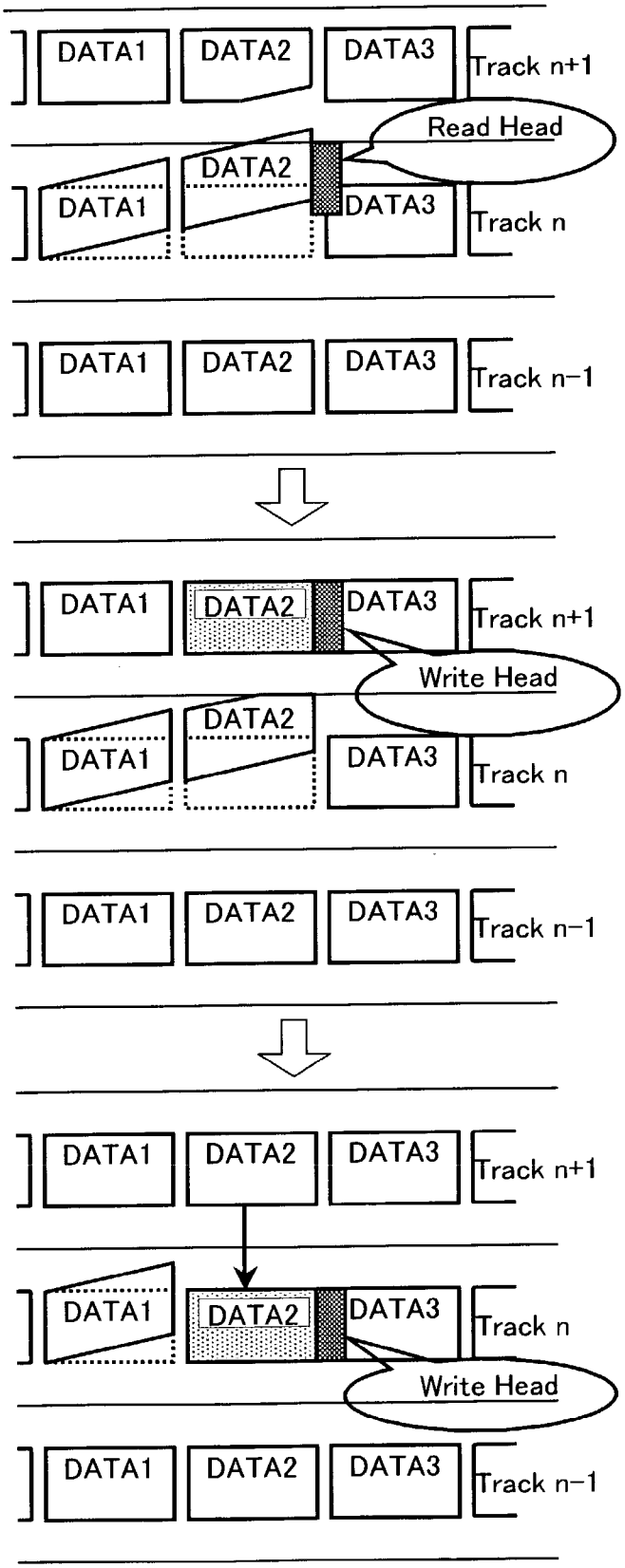
FIG. 21 is a diagram depicting conventional data guarantee processing at an off set read retry.

This embodiment is for a case when the read target sector itself cannot be read due to an off track write from an adjacent sector, therefore an offset DC erase is added to the recovery processing, so as to improve the read success rate of the read target sector. FIG. 16 is a flow chart depicting the adjacent sector guarantee processing according to the fourth embodiment of the present invention, and FIG. 17 is a diagram depicting the operation thereof. The processing in FIG. 16 as well is executed by the hard disk controller/main controller 28 in FIG. 1.

According to the third embodiment, it is assumed that the data of the sector which is affected by an off track write can all be recovered by a read retry after a read check. According to the fifth embodiment, handling when data of the read target sector could not be recovered by a read retry is added.

The processing flow in FIG. 16 will now be described with reference to FIG. 17.

(S41) After starting the data read operation, it is judged whether data in the sector p of the track n cannot be read even if an offset read retry is executed.

(S42) It is judged whether it is possible that an off track write occurred to the sector p which cannot be recovered by this read retry. In other words, as FIG. 17 shows, the sector p of the track n+1 is offset for +$\epsilon$1, and the read check is executed. In the same way, the sector p of the track n−1 is offset for −$\epsilon$1, and the read check is executed. In both read checks, it is judged whether only one side of the track cannot be read. If only one side cannot be read, it is detected that an off track write occurred from that side which cannot be read. If not, the data cannot be recovered, and error processing is executed.

(S43) When the possibility of an off track write is detected at the sector p of the track n, guarantee processing is executed. If a read error occurs to the track n+1, the direction pointer a is set to "+1", and if a read error occurs to the track n−1, the direction pointer a is set to "−1". At this time, the storage area of the buffer memory 30 is cleared.

(S44) When the possibility of an off track write is detected, the data of the adjacent sector where an off track write may have occurred is read with a position shift by the specified offset amount $\epsilon_1$. $\epsilon_1$ is the offset amount whereby data can be read without fail if an off track write did not occur. In other words, when the detected track is the track n and the sector p, the (n+a) track, that is the track which may have been influenced by the off track write is checked whether <$\gamma$1+$\gamma$2+1> sectors from the sector <p−$\gamma$1> can be read. Here $\gamma$1 is a number of guaranteed sectors which position before the sector p of the adjacent track, and $\gamma$2 is a number of guaranteed sectors which position after the sector p of the adjacent track.

Also this read check is executed after (a×$\epsilon$1) offsetting the head position from the center of the adjacent track n+a. In this case, the offset amount is (a×$\epsilon$1), so in the case of the track n−1, which is the case of a=−1, a read check is executed at a position where the head position is offset for a×$\epsilon$1 in the direction of the track n from the center position of the track n−1, as shown in FIG. 17.

In other words, whether an off track write occurred in the adjacent track n+1 or n−1 (difficulty in reading data) due to a read error in the track n can be detected by executing a read check in the adjacent track n+1 or n−1 at a position offset from the on track position in the direction of the track n. The sector address where the data could not be read during this read check is stored in the storage section (buffer) 30.

(S45) For only the sectors where the data could not be read during this check, reading is retried until the data is read. In other words, a read retry is executed in the adjacent track n+1 or n−1 with changing such read parameters as the positional offset amount of the head and the amplifier gain. If data in a sector where the data could not be read in the previous read retry can be read in this read retry, the data is temporarily stored in the storage section (buffer) 30.

(S46) For the sector <p> of the track n where data could not be read in the read retry, on the other hand, data in the sector <p> of the track n−1 which caused an off track write is held, then the head position is offset for −a×$\epsilon$2 in the direction of the track where the off track write occurred, and the sector <p> of the track n−1 is DC erased. Then the data is read by executing a second read retry of the sector <p> of the track n, where data could not be read. If the data in the sector where the data could not be read in the previous read retry can be read in this read retry, the data is temporarily stored in the storage section (buffer) 30.

(S47) As FIG. 17 shows, the data is rewritten in the sector of the adjacent track n−1 at the point when the data can be read. By this, the sector where the data became difficult to read due to an off track write can be recovered. After the rewrite, the storage section (buffer) 30 is cleared. This data is stored in another buffer area as error history for failure analysis.

(S48) Then the head is returned for a specified sectors (p−$\beta$1) from the detected sector p in the track n where the data is supposed to be read, and the data for ($\beta$1+$\beta$2+1) sectors and the sector <q> are rewritten. By this, the data in the track n itself is recovered. Then processing ends.

In this way, even when most of the data of the track where an off track write occurred cannot be read, an overwrite due to an off track write is erased by offsetting the head for $\epsilon$2 in the adjacent sector side, that is the plus side, and DC erasing for the off track written sector, and the data recovery rate improved. By this processing, the sector where the data could not be read due to an off track write can be read, and the data which became difficult to be read can be recovered by rewriting the data.

[Other Embodiments]

The disk storage device has been described as a magnetic disk device, but the present invention can be applied to other disk storage devices, including an optical disk device and a magneto-optical disk device.

The present invention has been described with embodiments, but various modifications are possible within the scope of the essential character of the present invention, which are not excluded from the technical scope of the present invention.

According to the present invention, even if write fault detection or offset read retry succeeds, a rewrite for guaranteeing an adjacent track is not immediately executed, but the possibility of an off track write is judged. And if it is possible that an off track write occurred, the sector which became difficult to read due to the off track write is detected, and only that sector is rewritten. So even if the disk device is used in an environment where write faults are frequently detected, the number of times of adjacent track data guarantee processing decreases, and a drop in the read/write performance can be prevented, and also since the difficulty in reading the data is detected with a predetermined offset by a read check, only the sector where the data became difficult to be read can be rewritten, and guarantee processing time can be decreased.

What is claimed is:

1. An adjacent track data guarantee processing method for guaranteeing data of a track adjacent to a predetermined track when data is written to a desired sector of said predetermined track by a head, comprising the steps of:
   detecting that said head wrote data on said sector of said predetermined track with a predetermined off track amount or more;
   detecting whether it is possible that said head caused an off track write on said adjacent track in accordance with said detection of writing with said predetermined off track amount or more;
   rewriting data on the sector of said predetermined track when detecting no possibility that said off track write occurred;
   offset-reading the data of an adjacent sector of said adjacent track in a predetermined track direction when detecting a possibility that said off track write occurred;
   executing a retry read of the adjacent sector if reading was not possible in said offset read step to read the data of the adjacent sector; and
   rewriting data obtained by said retry read on said adjacent sector read, and said data written on the sector of said predetermined track;
   wherein said retry read step comprises:
   a first retry read step of the adjacent sector of said adjacent track;
   an offset DC erase step of executing an offset DC erasing the sector of said predetermined track corresponding to the adjacent sector which could not be read in said first retry read; and
   a step of executing a second retry read of the adjacent sector which could not be read in said first retry read.

2. The adjacent track data guarantee processing method according to claim 1,
   wherein said step of detecting the possibility of an off track write further comprises a step of detecting the movement of said head with a position standard value greater than an off track position standard value of said off track write detection.

3. The adjacent track data guarantee processing method according to claim 1,
   wherein said step of detecting the possibility of an off track write further comprises a step of detecting a movement of said head by adding a condition on a speed or acceleration of said head to an off track position standard value for said off track write detection.

4. An adjacent track data guarantee processing method for guaranteeing data of a track adjacent to a predetermined track when data of a desired sector of said predetermined track is read by a head, comprising the steps of:
   detecting that said head read data of the sector of said predetermined track with a predetermined read offset amount or more;
   detecting whether it is possible that an off track write occurred to said adjacent track by the read offset amount whereby the data could be read;
   offset-reading the data of an adjacent sector of said adjacent track when detecting a possibility that said off track write occurred;
   executing a retry read of the adjacent sector which cannot be read in said offset-read step to read the data; and
   rewriting data obtained by said retry read on the adjacent sector and said data written on the sector of said predetermined track;
   wherein said retry read step comprises:
   a first retry read step;
   an offset DC erase step of offset-DC erasing the sector of said predetermined track corresponding to said adjacent sector which could not be read, when there is a sector which cannot be read in said first retry read; and
   a step of executing a second retry read of the adjacent sector which could not be read in said first retry read after said DC erasing.

5. A disk device for reading and writing data on a disk for storing data, comprising:
   a head for reading and writing data on a desired sector of a predetermined track of said disk;
   an actuator for positioning said head at the predetermined track of said disk; and
   a control unit for controlling said head and said actuator and detecting that said predetermined head wrote data on the sector of said track with a predetermined off track amount or more,
   wherein said control unit detects whether it is possible that said head caused an off track write on said adjacent track when said detection or writing with said predetermined off track amount or more occurred, rewrites the data on the sector of said predetermined track when detecting no possibility that said off track write occurred, and if it is possible that said off track write occurred, the control unit executes an offset read of the data of an adjacent sector of said adjacent track in said predetermined track direction, executes a retry read of the adjacent sector if reading was not possible in said offset read, and rewrites data obtained by said retry read on said adjacent sector, and said data written on the sector of said predetermined track;
   wherein said execution of said retry read includes a first retry read of the adjacent sector of said adjacent track, DC erasing of the sector of said predetermined track corresponding to said adjacent sector which could not be read, and a second retry read of the adjacent sector which could not be read in said first retry read.

6. The disk device according to claim 5, wherein said control unit detects the movement of said head with a position standard value greater than an off track position standard value of said off track write detection in order to detect said possibility of an off track write.

7. The disk device according to claim 5, wherein said control unit detects the movement of said head by adding a condition on a speed or acceleration of said head to an off track position standard value for said off track write detection in order to detect said possibility of an off track write.

8. A disk device for reading and writing data on a disk for storing data, comprising:
   a head for reading and writing data on a desired sector of a predetermined track of said disk;
   an actuator for positioning said head at the predetermined track of said disk; and
   a control unit for controlling said head and said actuator, detecting that said head read data on the sector of said predetermined track with a predetermined read offset amount or more, and detecting whether it is possible that an off track write occurred said adjacent track by said read offset amount whereby the data could be read, wherein said control unit executes an offset read of the data of an adjacent sector of said adjacent track, executes a retry read of the adjacent sector which cannot be read in said offset read, and rewrites data obtained by said retry read on said adjacent sector, and said data written on the sector of said predetermined track when detecting a possibility that said off track write occurred;

wherein said execution of said retry read includes a first retry read, an offset DC erasing of the sector of said predetermined track corresponding to said adjacent sector which could not be read in the first retry read and a second retry read of the adjacent sector which could not be read in said first retry read.

9. A disk device for reading and writing data on a disk for storing data, comprising:

a head for reading and writing data on a desired sector of a predetermined track of said disk;

an actuator for positioning said head at the predetermined track of said disk; and a control unit for controlling said head and said actuator and detecting that said predetermined head wrote data on the sector of said track with a predetermined off track amount or more, wherein said control unit detects whether it is possible that said head caused an off track write on said adjacent track when said off track write is detected, rewrites the data on the sector of said predetermined track when detecting no possibility that said off track write occurred, and if it is possible that said off track write occurred, the control unit executes an offset read of the data of the sector of said adjacent track in said predetermined track direction, executes a retry read of the adjacent sector if reading was not possible in said offset read, and rewrites data obtained by said retry read on said adjacent sector, and said data written on the sector of said predetermined track;

wherein said execution of said retry read includes a first retry read of the adjacent sector of said adjacent track, erasing of the sector of said predetermined track corresponding to said adjacent sector which could not be read, and a second retry read of the adjacent sector which could not be read in said first retry read.

10. A disk device for reading and writing data on a disk for storing data, comprising:

a head for reading and writing data on a desired sector of a predetermined track of said disk;

an actuator for positioning said head at the predetermined track of said disk; and a control unit for controlling said head and said actuator, detecting that said head read data on the sector of said predetermined track with a predetermined read offset amount or more, and detecting whether it is possible that an off track write occurred on said adjacent track by said read offset amount whereby the data could be read, wherein said control unit executes an offset read of the data of an adjacent sector of said adjacent track, executes a retry read of the adjacent sector which cannot be read in said offset read, and rewrites data obtained by said retry read on said adjacent sector and said data written on the sector of said predetermined track when detecting a possibility that said off track write occurred;

wherein said execution of said retry read includes a first retry read, an offset erasing of the sector of said predetermined track corresponding to said adjacent sector which could not be read in the first retry read and a second retry read of the adjacent sector which could not be read in said first retry read.

11. An adjacent track data guarantee processing apparatus, comprising:

a control portion for controlling a head for reading and writing data on a desired sector of a predetermined track of a disk and an actuator for positioning said head at the predetermined track of said disk and detecting that said head wrote data on the sector of said predetermined track with a predetermined off track amount or more; and adjacent guaranteeing processing portion for detecting whether it is possible that said head caused an off track write on said adjacent predetermined track when said off track write is detected, rewriting the data on the sector of said predetermined track when detecting no possiblity that said off track write occurred, and if it is possible that said off track write occurred, executing an offset read of the data of the sector of said adjacent track in said predetermined track direction, executing a retry read of the adjacent sector if reading was not possible in said offset read, and rewriting data obtained by said retry read on said adjacent sector, and said data written on the sector of said predetermined track;

wherein said execution of said retry read includes a first retry read of the adjacent sector of said adjacent track, erasing of the sector of said predetermined track corresponding to said adjacent sector which could not be read, and a second retry read of the adjacent sector which could not be read in said first retry read.

12. An adjacent track data guarantee processing apparatus comprising:

a control portion for controlling a head for reading and writing data on a desired sector of a predetermined track of a disk and an actuator for positioning said head at the predetermined track of said disk, detecting that said head read data on the sector of said track with a predetermined read offset amount or more, and detecting whether it is possible that an off track write occurred to said adjacent track by said read offset amount whereby the data could be read; and an adjacent track data guarantee portion for executing an offset read of the data of an adjacent sector of said adjacent track, executing a retry read of the adjacent sector which cannot be read in said offset read, and rewriting data obtained by said retry read on said adjacent sector and said data written on the sector of said predetermined track when detecting a possiblity that said off track write occurred;

wherein said execution of said retry read includes a first retry read, an offset erasing of the sector of said predetermined track corresponding to said adjacent sector which could not be read in the first retry read and a second retry read of the adjacent sector which could not be read in said first retry read.

* * * * *

UNITED STATES PATENT AND TRADEMARK OFFICE
CERTIFICATE OF CORRECTION

| | | |
|---|---|---|
| PATENT NO. | : 7,215,497 B2 | Page 1 of 1 |
| APPLICATION NO. | : 10/427806 | |
| DATED | : May 8, 2007 | |
| INVENTOR(S) | : Urata | |

It is certified that error appears in the above-identified patent and that said Letters Patent is hereby corrected as shown below:

In the Claims:

Claim 8, col. 21, line 1, delete "occurred said" and insert --occurred on said-- (Ex. Amend. dated 10/31/06).

Claim 11, col. 22, line 17, insert --an-- before "adjacent" (Ex. Amend. dated 10/31/06).

Signed and Sealed this

Twenty-fifth Day of September, 2007

JON W. DUDAS
*Director of the United States Patent and Trademark Office*